(12) United States Patent
Chandrashekar et al.

(10) Patent No.: US 12,143,684 B2
(45) Date of Patent: Nov. 12, 2024

(54) SYSTEMS AND METHODS FOR SELECTING A DATA DELIVERY NETWORK

(71) Applicant: Adeia Guides Inc., San Jose, CA (US)

(72) Inventors: Padmassri Chandrashekar, Karnataka (IN); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/223,427

(22) Filed: Jul. 18, 2023

(65) Prior Publication Data

US 2024/0022797 A1  Jan. 18, 2024

Related U.S. Application Data

(63) Continuation of application No. 17/362,335, filed on Jun. 29, 2021, now Pat. No. 11,750,889.

(51) Int. Cl.
| | |
|---|---|
| *H04N 21/6373* | (2011.01) |
| *H04L 65/65* | (2022.01) |
| *H04N 21/647* | (2011.01) |
| *H04N 21/845* | (2011.01) |
| *H04N 21/858* | (2011.01) |

(52) U.S. Cl.
CPC ......... *H04N 21/6373* (2013.01); *H04L 65/65* (2022.05); *H04N 21/64738* (2013.01); *H04N 21/8456* (2013.01); *H04N 21/8586* (2013.01)

(58) Field of Classification Search
CPC ........... H04N 21/6373; H04N 21/2662; H04N 21/64738; H04N 21/8456; H04N 21/26258; H04N 21/44209; H04N 21/4622; H04L 67/02; H04L 65/80; G06F 16/40

See application file for complete search history.

(56) References Cited

U.S. PATENT DOCUMENTS

| | | | |
|---|---|---|---|
| 9,613,042 B1 * | 4/2017 | Joseph | G06F 16/16 |
| 11,146,839 B1 * | 10/2021 | Stroffolino | H04L 65/613 |
| 11,750,889 B2 | 9/2023 | Chandrashekar et al. | |
| 2012/0240176 A1 * | 9/2012 | Ma | G06F 21/10 725/114 |
| 2014/0108671 A1 * | 4/2014 | Watson | H04L 65/612 709/231 |
| 2015/0200991 A1 * | 7/2015 | Kwon | H04L 65/764 709/219 |
| 2016/0337426 A1 * | 11/2016 | Shribman | H04L 65/612 |
| 2017/0187768 A1 * | 6/2017 | Huang | H04L 67/1021 |
| 2017/0188065 A1 | 6/2017 | Major | |
| 2018/0241796 A1 * | 8/2018 | Srinivasan | H04L 65/80 |
| 2021/0029190 A1 * | 1/2021 | Knowler | H04L 65/752 |
| 2021/0084382 A1 * | 3/2021 | Kellicker | H04N 21/2407 |
| 2022/0417610 A1 | 12/2022 | Chandrashekar et al. | |

* cited by examiner

*Primary Examiner* — Caroline H Jahnige
(74) *Attorney, Agent, or Firm* — Haley Guiliano LLP

(57) ABSTRACT

Systems and methods for selecting a data delivery network are disclosed. The methods comprise requesting multimedia content delivery, the request comprising an indication of available bandwidth, receiving an indication of an expected performance threshold of a multimedia content item associated with the request for multimedia content, determining a fetch time for the multimedia content item to be delivered from a first data delivery network, and, in response to the fetch time being above the expected performance threshold, selecting a second data delivery network to deliver the multimedia content item.

20 Claims, 18 Drawing Sheets

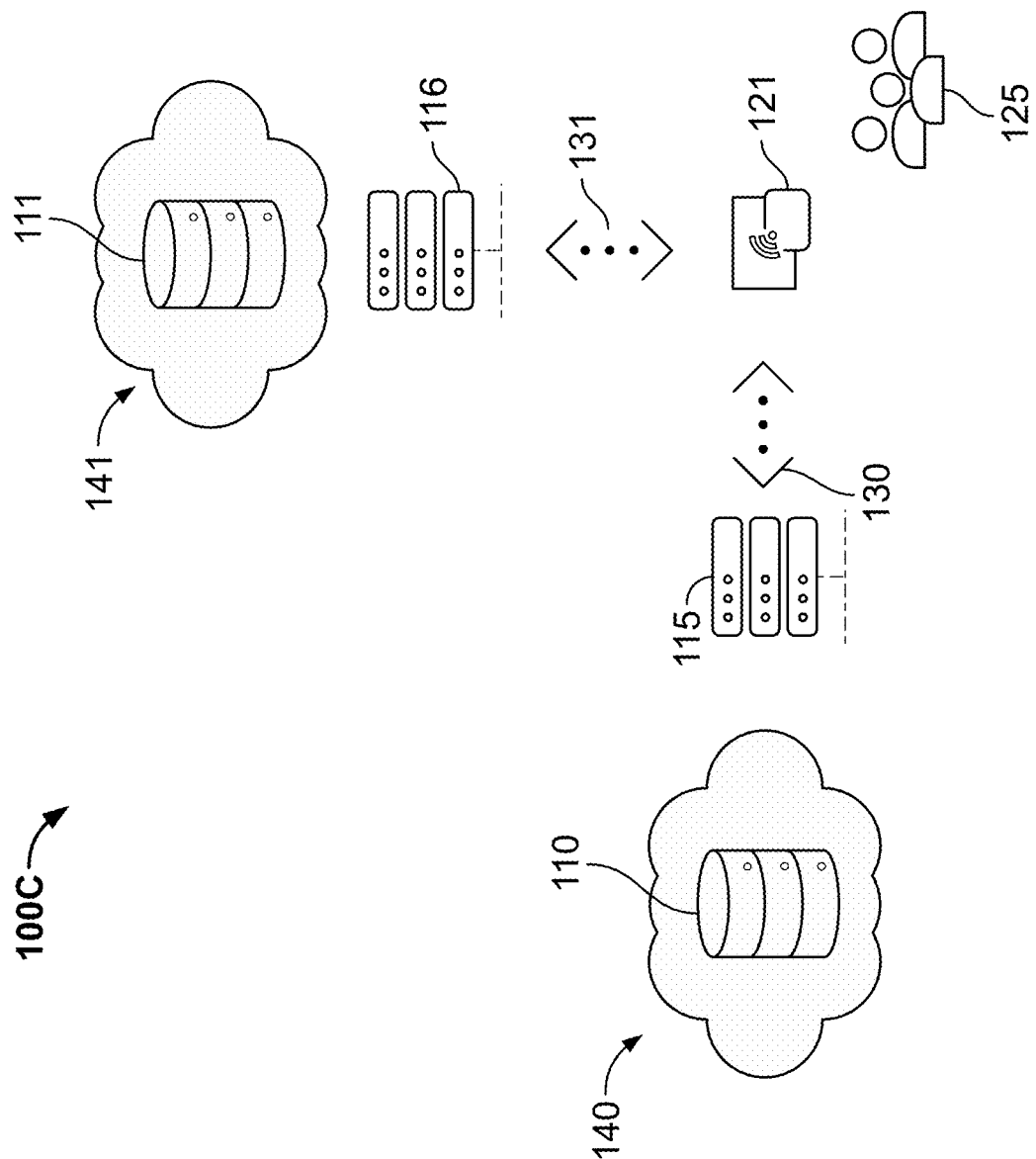

410

| Node | Total BW (Mbps) | Total Ping (ms) | Distance (Miles) | Jitter (ms) | Total Packet Loss | Fetch Time (Seconds) | Expected Performance Threshold (Download Time) (Seconds) | Time Stamp | Segment Reference |
|---|---|---|---|---|---|---|---|---|---|
| LDN_18 | 7.5 | 2 | <50 | 2 | 0 | 2.01 | 2.2 | 03/29/2021 16:20:06.20 | 0-862 |
| NYC_01 | 7.5 | 115 | 3450 | 4 | 18 | 2.125 | - | 03/29/2021 16:20:06.31 | 0-862 |
| ... | ... | ... | ... | ... | ... | ... | ... | ... | ... |
| SI_001 | 7.5 | 150 | 5350 | 2 | 42 | 2.155 | - | 03/29/2021 16:20:06.35 | 0-862 |

| Node | Total BW (Mbps) | Total Ping (ms) | Distance (Miles) | Jitter (ms) | Total Packet Loss | Fetch Time (Seconds) | Expected Download Time (Seconds) | Time Stamp | Segment Reference |
|---|---|---|---|---|---|---|---|---|---|
| LDN_18 | 7.5 | 721 | <50 | 60 | 333 | 4.25 | 2.2 | 03/29/2021 16:20:09.20 | 863-7113 |
| NYC_01 | 7.5 | 115 | 3450 | 8 | 18 | 2.125 | - | 03/29/2021 16:20:09.31 | 863-7113 |
| ... | ... | ... | ... | ... | ... | ... | ... | ... | ... |
| SI_001 | 7.5 | 150 | 5350 | 12 | 42 | 2.155 | - | 03/29/2021 16:20:09.35 | 863-7113 |

FIG. 4B

```
700
   ┌ 0  <?xml version="1.0" encoding="UTF-8"?>
702│ 1  <MPD xmlns:xsi="http://www.w3.org/2001/XMLSchema-instance" xmlns="urn:mpeg:dash:schema:mpd:2011DASH-MPD.xsd
704│ 2  <BaseURL>https://video.platform.com/v1</BaseURL>
   │ 3  <Period>
710│ 4  <!--English Audio --><EXPTAG="0" Priority="High">
   │ 5  <AdaptationSet mimeType="audio/mp4" codecs="mp4a.40.5" lang="en" subsegmentAlignment="true" subsegmentStartsWithSAP="1">
720│ 6  <Representation id="0" bandwidth="64000">
   │ 7  <URL>Joelsmixtape_AAC48K_064.mp4.dash</BaseURL>
   │ 8  </Representation>
   │ 9  </AdaptationSet>
730│10  <!--Video -->
   │11  <AdaptationSetmimeType="video/mp4" codecs="avc1.42401E" subsegmentAlignment="true" subsegmentStartsWithSAP="1">
742│12  <Representation id="1" bandwidth="1000000" width="2160" height="1440"><EXPTAG="0" Priority="High">
   │13  <URL>Joelsmixtape_H264BPL30_0100.264.dash<BaseURL>
   │14  </Representation>
744│15  <Representation id="2" bandwidth="2000000" width="3840" height="2160"><EXPTAG="1" Priority="Low">
   │16  <URL>Joelsmixtape_H264BPL30_0200.264.dash<BaseURL>
   │17  </Representation>
   │18  </AdaptationSet>
750│19  </Period>
   └20  </MPD>
```

FIG. 7

```
1  <Representation id="1" codecs="avc1" mimeType="video/mp4" width="2160" height="1440" startWithSAP="1" bandwidth="46986"
   EXP_DL="2">
2      <SegmentList duration="1">
3          <SegmentURL media="main/safety101/2.m4s" mediaRange="863-7113"/>
4          <SegmentURL media="main/safety101/3.m4s" mediaRange="7114-14104"/>
5          <SegmentURL media="main/safety101/4.m4s" mediaRange="14105-17990"/>
6      </SegmentList>
7  </Representation>
8  <Representation id="2" codecs="avc1" mimeType="video/mp4" width="3840" height="2160" startWithSAP="1" bandwidth="91932"
   EXP_DL="3">
9      <SegmentList duration="1">
10         <SegmentURL media="main/safety201/2.m4s" mediaRange="865-11523"/>
11         <SegmentURL media="main/safety201/3.m4s" mediaRange="11524-25621"/>
12         <SegmentURL media="main/safety201/4.m4s" mediaRange="25622-33693"/>
13     </SegmentList>
14 </Representation>
```

FIG. 8A

```
1 <Representation id="1" codecs="avc1" mimeType="video/mp4" width="320" height="240" startWithSAP="1" bandwidth="46986">
2   <SegmentList duration="1">
3     <SegmentURL media="main/safety101/2.m4s" mediaRange="863-7113" EXP_DL="0.5"/>
4     <SegmentURL media="main/safety101/3.m4s" mediaRange="7114-14104" EXP_DL="0.5"/>
5     <SegmentURL media="main/safety101/4.m4s" mediaRange="14105-17990" EXP_DL="1"/>
6   </SegmentList>
7 </Representation>
8 <Representation id="2" codecs="avc1" mimeType="video/mp4" width="320" height="240" startWithSAP="1" bandwidth="91932">
9   <SegmentList duration="1">
10    <SegmentURL media="main/safety201/2.m4s" mediaRange="865-11523" EXP_DL="1"/>
11    <SegmentURL media="main/safety201/3.m4s" mediaRange="11524-25621" EXP_DL="1.2"/>
12    <SegmentURL media="main/safety201/4.m4s" mediaRange="25622-33693" EXP_DL="0.8"/>
13  </SegmentList>
14 </Representation>
```

1010 { | 1 | `<video src="mixtape.mpd" type="application/dash+xml" bandwidth="1000000"></video>` |

FIG. 10

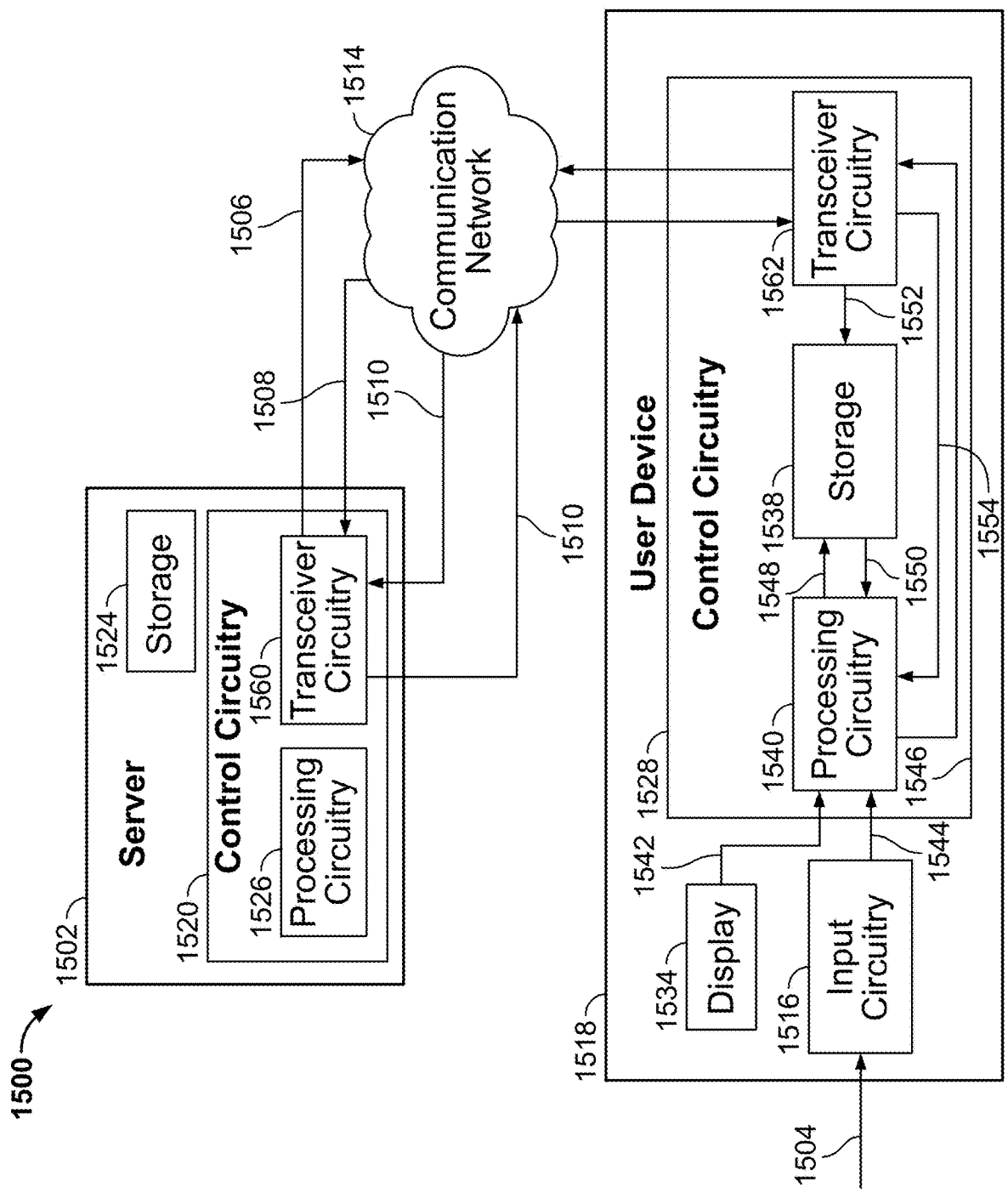

SYSTEMS AND METHODS FOR SELECTING A DATA DELIVERY NETWORK

CROSS-REFERENCE TO RELATED APPLICATION

This application is a continuation of U.S. patent application Ser. No. 17/362,335, filed Jun. 29, 2021, the disclosure of which is hereby incorporated by reference herein in its entirety.

BACKGROUND

The present disclosure relates to adaptive video streaming systems and methods and, more particularly, to systems and methods to reduce buffering for a client in a content delivery network due to errors at the content delivery network.

SUMMARY

Adaptive bitrate streaming (also known as adaptive streaming or adaptive video streaming) is a technology designed to deliver video to a user in the most efficient and useable quality possible. Conventional streaming media systems that deliver media assets over a network often use adaptive bitrate algorithms to optimize a balance between providing a user with the highest possible media quality (e.g., bitrate) and minimizing playback stalling (known as buffering). By way of summary, streaming media systems aim to maximize stability by switching bitrates when, for example, the transfer rate is too slow compared to the play speed of the media asset. Most video systems select a bitrate that most closely matches an observed network bandwidth and request an appropriate quality of a next segment of the media asset that the bandwidth can accommodate at that time. In this way, the video system can provide smooth playback and a quick start of the media asset.

While in the past most video or audio streaming technologies utilized streaming protocols such as real-time transport protocol (RTP) with real-time streaming protocol (RTSP), modern adaptive streaming technologies are mostly based on hypertext transfer protocol (HTTP). Current adaptive bitrate streaming solutions, such as MPEG-DASH or Apple HLS, allow a user to select a priority of quality when watching a video. In most situations, users prefer to watch a lower-quality portion of a video rather than waiting for a higher-quality portion of the video to be downloaded.

Content Delivery Networks (CDNs) or Data Delivery Networks (DDNs) are geographically distributed networks of proxy servers and their data centers. CDNs aim to provide high availability and performance by distributing the service, spatially, relative to end-users. CDNs have grown to serve a large portion of the internet content today, including web objects (e.g., text, graphics, and scripts), downloadable objects (e.g., media files, software, documents), applications (e.g., e-commerce, portals), live streaming media, social media sites, and on-demand streaming services (e.g., YouTube, Netflix, Prime Video, etc). Accordingly, CDNs may be considered essential to the internet ecosystem.

Content providers, ie., over-the-top (OTT) platforms, and content owners pay CDN operators to deliver their content to their end-users. However, in some circumstances the nearest CDN node to an end-user experiences interruptions or buffering even though there is ample bandwidth available. Such errors may be caused by, for example, network congestion, network glitches, hardware malfunction at the CDN node. In such circumstances, the end-user will require rerouting to an alternate CDN node to obtain the rest of the content (e.g., the next segment of video-on-demand content).

Data delivery mechanisms, techniques, and systems described herein are introduced to provide a better experience for a user of a platform that provides content via a content delivery network.

In a first approach, there is provided a method for selecting a data delivery network, the method comprising requesting, from a user device to a multimedia server, multimedia content delivery, the request comprising an indication of available bandwidth; receiving, from the multimedia server, an indication of an expected performance threshold of a multimedia content item associated with the request for delivery of multimedia content; determining a fetch time for the multimedia content item to be delivered, to the user device, from a first data delivery network; and in response to the fetch time being above the expected performance threshold, selecting a second data delivery network to deliver, to the user device, the multimedia content item.

In some examples, the method further comprises receiving, from the multimedia server, performance information of a plurality of other data delivery networks, wherein the selecting the second data delivery network is further based on the performance information of the plurality of other data delivery networks.

In some examples, the method further comprises determining a second fetch time for a second multimedia content item to be delivered from the first data delivery network; and in response to the second fetch time being above the expected performance threshold, selecting the second data delivery network to deliver, to the user device, the second multimedia content item.

In some examples, the multimedia content item is comprises a plurality of segments, wherein each segment is further associated with a set of alternative variants. For example, the multimedia content item may be an adaptive bitrate video or adaptive bitrate stream, comprising a plurality of segments. In some examples, the multimedia content item is a segment of a plurality of segments.

In some examples, the selected second data delivery network delivers the same or next segment of the multimedia content item as the first data delivery network. For example, in some situations, the buffering of the currently requested multimedia content item causes the fetch time to exceed the expected download time (e.g., the expected performance threshold). Therefore, the selected second data delivery network delivers the requested multimedia content item in place of the first data delivery network. However, in some examples, the requested multimedia content item arrives, but the fetch time was still too long, therefore the selected second data delivery network will provide the next multimedia content item (wherein the multimedia content item was a segment of an adaptive bitrate content video).

In some examples, the alternative variants of the multimedia content item comprise a plurality of bitrate variants; and the method further comprises determining a fetch time for two or more of the bitrate variants. For example, a higher bitrate variant of the multimedia content item may have a fetch time that is too long, i.e., longer than the expected performance threshold; therefore the fetch time of a lower bitrate variant can be determined to ensure that the first data delivery network is experiencing issues. Issues such as high latency, high jitter, high ping, and congestion are often not deemed issues at the media server side (CDN side) and are therefore not signaled to the user device; in the examples herein, the user device can assess an issue and decide to switch CDNs.

In some examples, the first and second data delivery networks are associated with the same over-the-top (OTT) content platform. In some examples, the first and second data delivery networks are associated with different OTT content platforms. For example, the first and second data delivery networks may be a part of the same CDN but are two different nodes or edge servers within the same data center, each with a cached copy of the requested multimedia content. In some examples, the first and second data delivery networks are entirely different CDNs servicing different content providers and OTT platforms.

In some examples, the method further comprises determining the fetch time for the multimedia content item to be delivered, to the user device, of a plurality of data delivery networks; ranking each of the plurality of data delivery networks based on the fetch time for the multimedia content item to be delivered to the user device; and selecting a data delivery network with the lowest fetch time to deliver, to the user device, the multimedia content item. For example, in some situations the user device, such as a user content player, will determine the fetch time for a plurality of CDNs, nodes, media servers, or edge servers within the same data center and choose the next best source for the requested content based on a ranking. The ranking may be based on the fetch time such that the lowest fetch time is the highest-ranked source for the requested multimedia content.

In a second approach, there is provided a method for generating a manifest for multimedia content delivery, the method comprising receiving an indication of available bandwidth at a multimedia content player; determining an expected performance threshold for the multimedia content player to download a media content item, based on the indication of available bandwidth; generating a manifest, the manifest comprising a plurality of Uniform Resource Locators, URLs, and an indication of the expected performance threshold and transmitting the manifest to the user device.

In some examples, each URL comprises an alternative variant of the media content item. For example, there may be a plurality of URLs and each URL is a different bitrate variant of the requested multimedia content item. In some examples, each URL comprises a different segment of the multimedia content. In some examples, a combination of alternative variants and different segments are provided in the URLs.

In some examples, the alternative variants comprise a plurality of bitrate variants, and the method further comprises determining an expected performance threshold for two or more of the bitrate variants.

In some examples, the plurality of URLs are associated with a same over-the-top, OTT, content platform. In some examples, the plurality of URLs are associated with two or more over-the-top, OTT, content platforms. For example, the generated manifest may contain the URLs to a second data delivery network as a fail-over.

In another approach, there is provided a media transmission device comprising 1) a transceiver module to request multimedia content delivery, the request comprising an indication of available bandwidth and receive an indication of an expected performance threshold of a multimedia content item associated with the request for multimedia content; 2) a network module, coupled to the transceiver module, adapted to determine an available bandwidth of the media transmission device and determine a fetch time for the multimedia content item to be delivered from a first data delivery network; and 3) a control module, coupled to the transceiver module and the network module, adapted to, in response to the fetch time being above the expected performance threshold, select a second data delivery network to deliver the multimedia content item.

In another approach, there is provided a media server, comprising multimedia content storage and processing circuitry, wherein the processing circuitry is configured to receive an indication of available bandwidth at a multimedia content player; determine an expected performance threshold for the multimedia content player to download a media content item, based on the indication of available bandwidth; generate a manifest, the manifest comprising a plurality of Uniform Resource Locators (URLs) and an indication of the expected performance threshold; and transmit the manifest to the user device.

In another approach, there is provided a system, the system comprising: means for requesting multimedia content delivery, the request comprising an indication of available bandwidth; means for receiving an indication of an expected performance threshold of a multimedia content item associated with the request for multimedia content; means for determining a fetch time for the multimedia content item to be delivered from a first data delivery network; and, in response to the fetch time being above the expected performance threshold, means for selecting a second data delivery network to deliver the multimedia content item.

In another approach, there is provided a non-transitory computer-readable medium having instructions encoded thereon for carrying out a method, the method comprising: requesting multimedia content delivery, the request comprising an indication of available bandwidth; receiving an indication of an expected performance threshold of a multimedia content item associated with the request for multimedia content; determining a fetch time for the multimedia content item to be delivered from a first data delivery network; and in response to the fetch time being above the expected performance threshold, selecting a second data delivery network to deliver the multimedia content item.

In another approach, there is provided a non-transitory computer-readable medium having instructions encoded thereon for carrying out a method, the method comprising: receiving an indication of available bandwidth at a multimedia content player; determining an expected performance threshold for the multimedia content player to download a media content item, based on the indication of available bandwidth; generating a manifest, the manifest comprising a plurality of URLs and an indication of the expected performance threshold; and transmitting the manifest to the user device.

Advantages of the present disclosure allow for an uninterrupted viewing experience when a user is attempted to consume media content and/or reduce the inefficiencies of selecting a data delivery network.

BRIEF DESCRIPTION OF THE DRAWINGS

The above and other objects and advantages of the disclosures will be apparent upon consideration of the following detailed description, taken in conjunction with the accompanying drawings, in which:

FIGS. 1A, 1B, and 1C illustrate exemplary content delivery systems, in accordance with some embodiments of the disclosure.

FIGS. 4A and 4B are examples of stored network performance information associated with nodes of a content delivery network, in accordance with some embodiments of the disclosure.

FIGS. 7, 8A, and 8B illustrate exemplary pseudo-code for an adaptive bitrate manifest containing novel elements, in accordance with some embodiments of the disclosure.

FIG. 10 illustrates exemplary pseudo-code for an adaptive bitrate request, in accordance with some embodiments of the disclosure.

FIG. 15 is a block diagram representing devices, components of each device, and data flow therebetween for an adaptive video streaming system, in accordance with some embodiments of the disclosure.

DETAILED DESCRIPTION

Methods and systems are provided herein for adaptive bitrate streaming comprising advertisements.

As described above, adaptive streaming is fast becoming the most widely used method for video delivery to end-users over the internet. The ITU-T P.1203 standard is the first standardized quality of experience model for audiovisual HTTP-based adaptive streaming. The present disclosure provides an extension for the existing standardized video quality model as well as new formats, i.e., H.265, VP9, and AV1, and resolutions larger than full-HD (e.g., UHD-1). The main criterion for the development of better-quality monitoring and adaptation algorithms is to reduce the overall required bandwidth while not having any perceivable impact on the video and audio quality. However, the current state of the art of delivering media content is to provide a manifest comprising a plurality of URLs to the media content request. Often there is an issue with buffering when requesting a segment of media content (a media content item), even though there is adequate bandwidth at the user device. Thus, a method of switching between sources of media content is desirable.

Adaptive bitrate streaming is a method of video streaming over HTTP where the source content is encoded at multiple bit rates. Each of the different bit rate streams is segmented into small multi-second parts. The segment size can vary depending on the particular implementation, but they are typically between two and ten seconds. First, the client downloads a manifest file that describes the available stream segments and their respective bit rates. During stream start-up, the client usually requests the segments from the lowest bit rate stream. If the client finds that the network throughput is greater than the bit rate of the downloaded segment, then it will request a higher bit rate segment. Later, if the client finds that the network throughput has deteriorated, it will request a lower bit rate segment. An adaptive bitrate algorithm in the client performs the key function of deciding which bit rate segments to download, based on the current state of the network. However, when errors occur at the serverside, the client is left waiting for instructions.

Figure 1A:
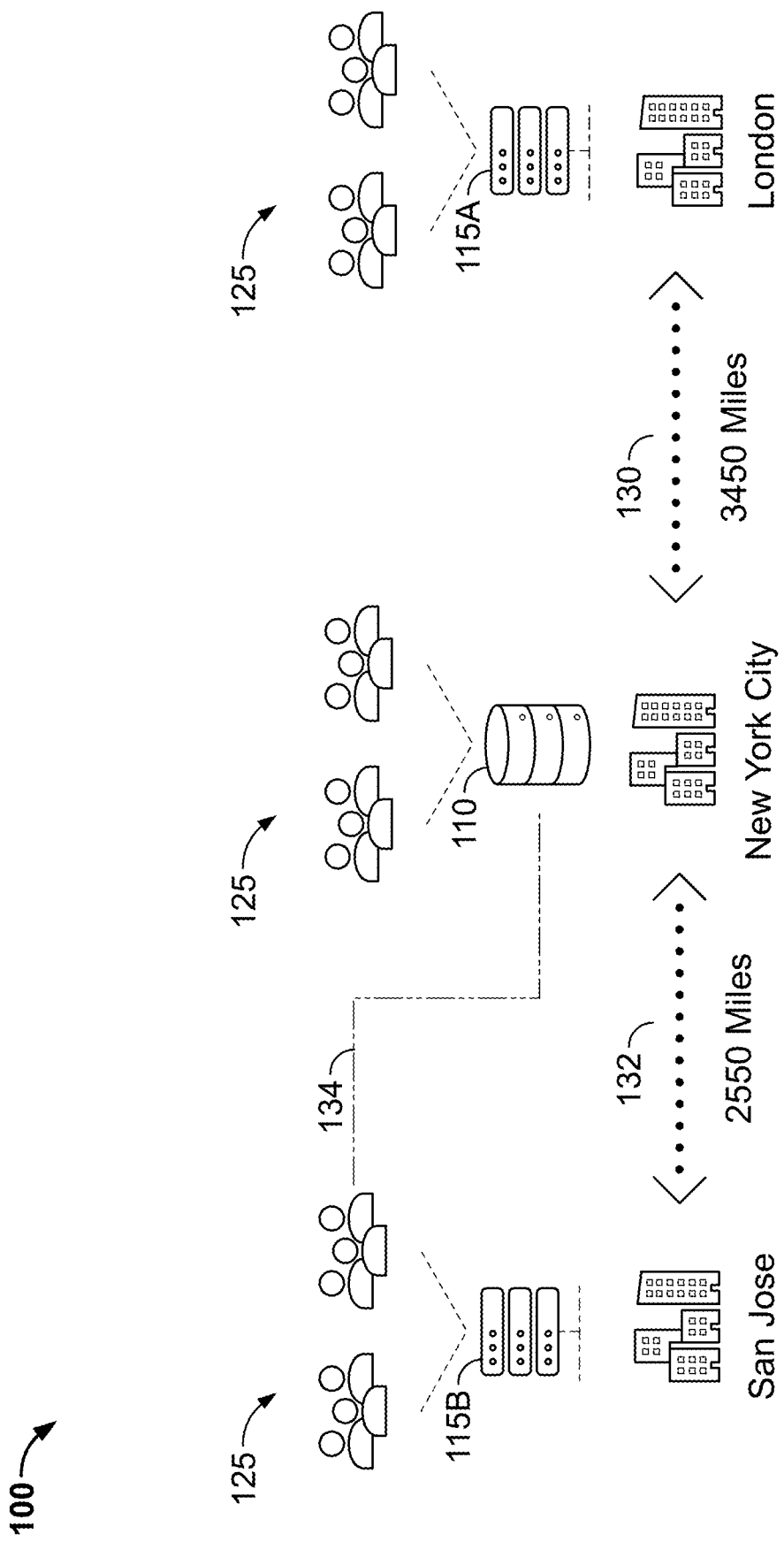
Figure 1B:
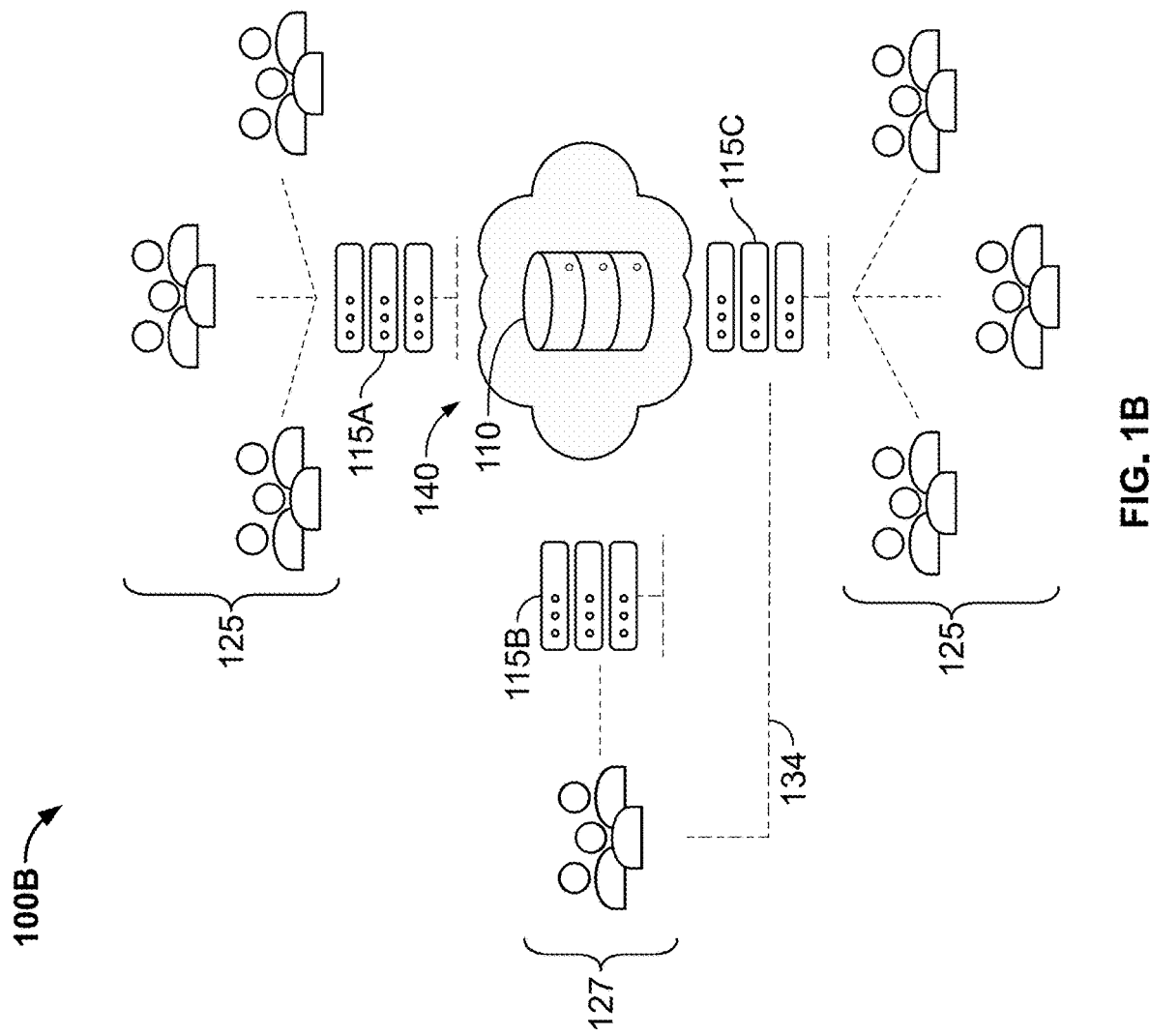

FIGS. 1A, 1B and 1C illustrate an exemplary content delivery system, in accordance with some embodiments of the disclosure. Shown is a content delivery network 100. The content delivery network 100 comprises a central server 110 and two satellite servers or "nodes" 115A, 115B, although, in practice, there are typically 10s or 100s of satellite servers or nodes. In some examples, the central server 110 is the primary server for a content source, such as a media content item for a video-on-demand (VOD) platform. In some examples, the central server 110 may be located a considerable distance from the node servers. For example, as shown in FIG. 1A, the central server may be located in New York City and is connected to a first node server 115A hosted in, for example, London, 3450 miles away via high-speed data link 130, and to a second node server, 115B hosted in, for example, San Jose, 2550 miles away via high-speed data link 132. In some examples, the first and second node servers 115A, 115B comprise a copy of the content of the central server 110, known as a cached copy or version. In some examples, the content items stored on the central server 110 and the node servers 115A, 115B comprise a plurality of bitrate variants for use in an adaptive bitrate streaming service, as mentioned above. In some examples, media content stored on servers 110, 115A, and 115B are compatible with known adaptive bitrate stream technologies (e.g., MPEG-DASH, Adobe HTTP Dynamic Streaming, Apple HTTP Live Streaming, Microsoft Smooth Streaming, QuavStreams Adaptive Streaming over HTTP, upLynk, or the like).

Each of the central server 110, the first node server 115A and the second node server 115B provides the content stored thereon to a plurality of users 125. In some examples, it is the video players or user content players that are connected to the servers. Video players, or user content players, that support adaptive bitrate streaming (e.g., DASH or HLS) need to monitor the users' 125 bandwidth so that the player can determine at what bitrate to request segments (e.g., a media content item) of the media content. Typically, the plurality of users 125 connect to the nearest geographical server in the first instance, as this usually results in the lowest ping, latency and jitter between the user and the server.

In some exemplary situations, the node or CDN becomes unresponsive to the user content player even though the user content player has an established connection with the node, server, or CDN and adequate bandwidth. In many situation the CDN is physically fully functional, and not generating an error signal, but the fact remains that the user content player is receving the requested multimedia content. If a user content player connected to node 115B was able to switch to a second CDN, server, or node, the optimal viewing experience would be maintained and unnecessary lowering of the user content player's bitrate request would be avoided. The mechanism for determining that a switch is required will be explained in more detail below. However, such a switch would be facilitated through connection 134. For example, if a user 125 connected to node 115B experiences such issues, the user content player of user 125 would make a connection 134 to a different data delivery network, e.g., central server 110 in this example.

FIG. 1B illustrates another exemplary content delivery system, in accordance with some embodiments of the disclosure. Shown is a content delivery network 100B comprising a central server 110 hosted in the cloud 140. The central server 110 is connected to three satellite servers or nodes 115A, 115B and 115C. A plurality of users 125 and 127 are connected to the nodes 115A, 115B, or 115C and are receiving multimedia content. As shown in FIG. 1B, the users 127 are also connected to node 115C via connection 134. Connection 134 is shown to illustrate the teachings of the present disclosure, as will be described in more detail below. However, by way of summary, when the time to fetch a media content item from any of the nodes 115A, 115B or 115C exceeds an expected download time, the user content player from the users 127 can retrieve the media content item, or a second media content item, from the node 115C via connection 134. That is to say that the time to fetch a multimedia content item exceeds an expected performance threshold, and therefore the user content player selects a second data delivery network to provide the requested multimedia content.

FIG. 1C illustrates another exemplary content delivery system, in accordance with some embodiments of the disclosure. Shown is a content delivery network 100C comprising a first central server 110 hosted in the cloud 140. The first central server 110 is connected to a first satellite server or node 115, which is in turn connected to a user device 121 via a first data connection 130. The first central server 110 is associated with a first over-the-top, OTT, provider's platform. The content delivery network 100C also comprises a second central server 111 hosted in the cloud 141. The second central server 111 is connected to a second satellite server or node 116, which is in turn connected to a user device 121 via a second data connection 131.

Figure 6:
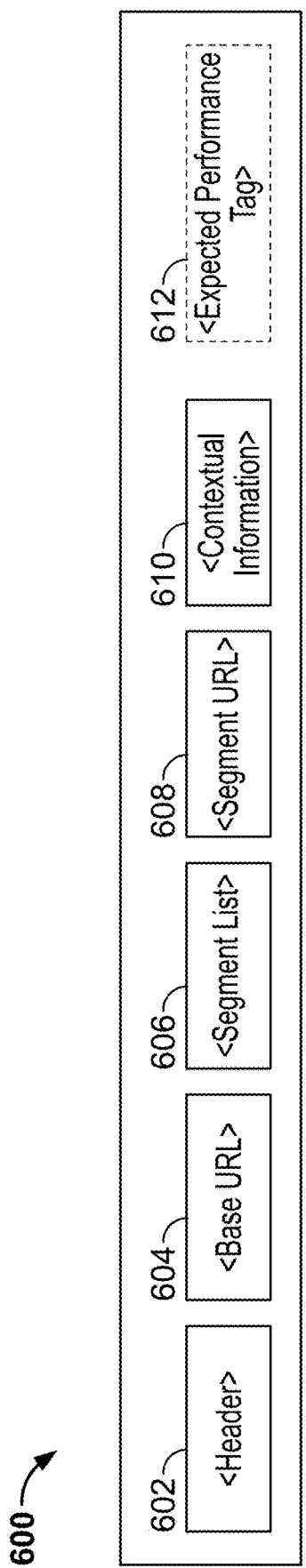
FIG. 6 is a pictorial representation of an exemplary manifest, in accordance with some embodiments of the disclosure.

In some examples, the methods and systems described herein apply to user device 121, which may be a user content player (shown in more detail in FIG. 6). In some examples, the user device is a home gateway, a smart appliance (such as a smart TV), a smartphone, computer, or laptop. The user content player on device 121 can therefore receive multimedia content from either first central server 110 or second central server 111 via first node 115 or second node 116. In some examples, the first and second central servers 110 and 111 comprise the same or similar versions (copies) of media content requested by device 121. For example, each server or node may have a cached copy of the movie "John Wick." Therefore, in accordance with the methods described herein, the user device 121 may switch from central server 110 to 111 when a fetch time is greater than an expected download time for a multimedia content item associated with the requested multimedia content, "John Wick," as will be described in more detail below.

Currently, video players estimate the available bandwidth by, for example, using the time it takes to download a segment of the adaptive bitrate content. In addition, many over-the-top (OTT) video platform services implement multi-CDN strategies, such as that shown in FIGS. 1A and 1B, to mitigate outages, or poor performance, and for cost-saving purposes. However, when it comes to selecting which CDN a client should be connected to (i.e., which CDN is optimal for the client) and when the user content player should be switched to another CDN, the OTT platform has a series of rules based on a variety of parameters to make a decision. For example, constant re-buffering during streaming, latency, high round-trip time (RTT), and location of client may all influence the determination of CDN selection switching.

In accordance with embodiments of the present disclosure, methods and systems for determining when a user content player needs to be switched to a different node of a CDN, an entirely different CDN, or a different edge server within a data center are disclosed.

Figure 2:
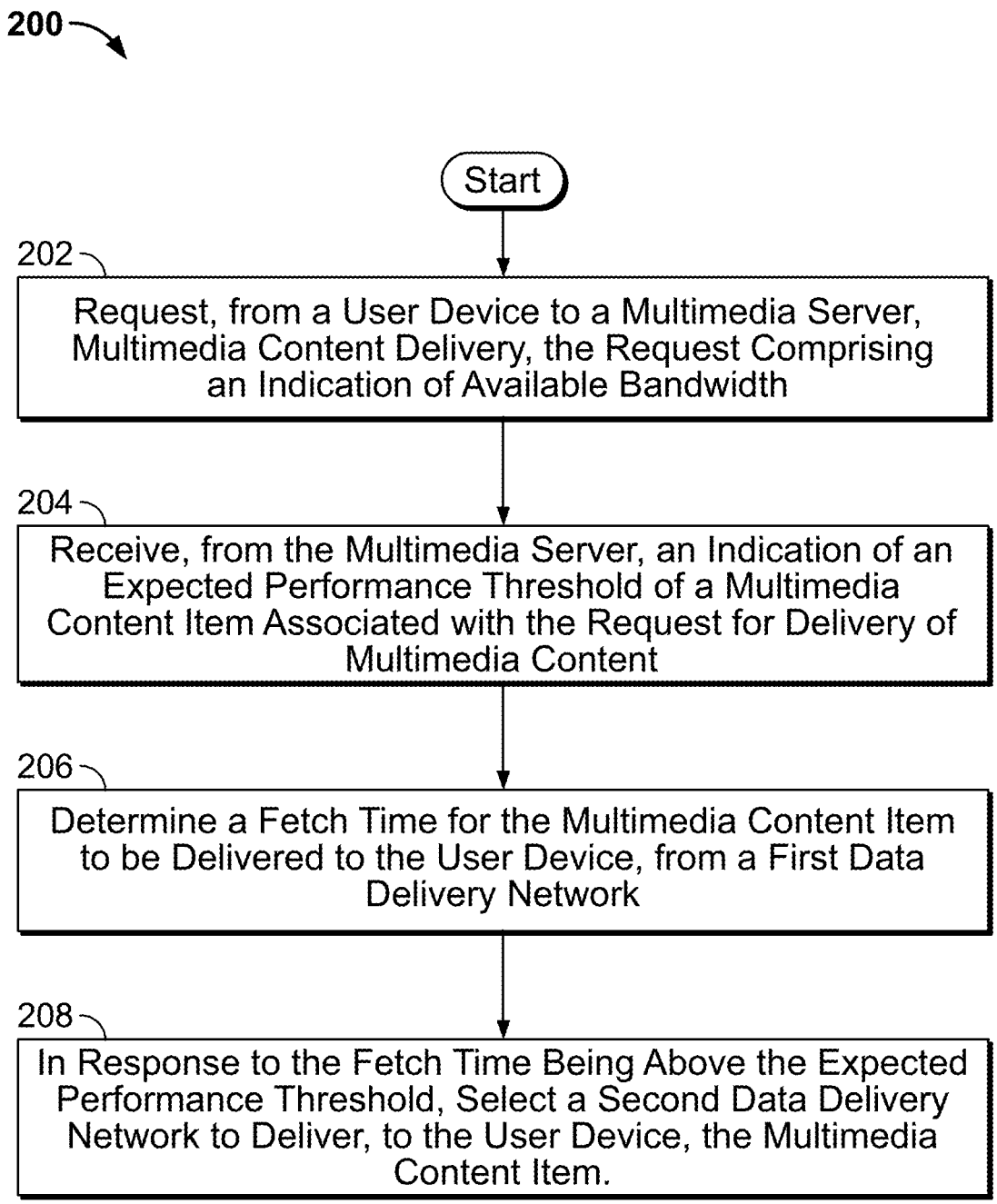
FIG. 2 illustrates an exemplary flowchart of the processing involved in selecting a data delivery network, in accordance with embodiments of the disclosure.

FIG. 2 illustrates an exemplary flowchart of the processing involved in selecting a data delivery network, in accordance with embodiments of the disclosure. Process 200 begins at 202. At step 202, a request from a user device to a multimedia server is made, requesting multimedia content delivery, the request comprising an indication of available bandwidth. For example, the request may be an HTTP GET request from the user content player to a multimedia server containing a copy of the requested multimedia content. In some examples, the request comprises an indication of the available bandwidth of the user device.

At step 204, an indication of an expected performance threshold of a multimedia content item associated with the request for delivery of multimedia content is received from the multimedia server. For example, the multimedia server may determine that, based on the available bandwidth of the user device, it will take X seconds to download the requested media content item (segment) or a plurality of items (segments).

At step 206, a fetch time for the multimedia content item to be delivered to the user device, from a first data delivery network, is determined. In some examples, the fetch time is the time it will take for the user content player to actually obtain or download the requested media content from the media server (e.g., a mode in a content delivery network). For example, after the user content player has requested content, the fetch time may be based on the current performance of the download of the data from the media server. In some examples, the fetch time is determined and signaled by the media server to the user content player. In this way, if the fetch time signal isn't received before the expected performance threshold, then the user content player knows the fetch time has exceeded the expected performance threshold. In some examples, the user content player can determine the fetch time based on the current performance of downloading the current data.

In some examples, fetch time is the time taken to download the most recent segment of a plurality of segments. In some examples, the fetch time is an average download rate, for example, 1 Mbit/s (one megabit per second). In some examples, the fetch time is the current time elapsed since beginning to download a current segment.

At step 208, in response to the fetch time being above the expected performance threshold, the method comprises selecting a second data delivery network to deliver, to the user device, the multimedia content item. For example, the user content player determines a time taken to fetch the media content item, and compares that to an expected download time to download the media content item (e.g., expected performance information). In some examples, wherein the user content player has the bandwidth, but the fetch time is too high relative to the expected performance threshold, the user content player can select another CDN, node, or edge server—even though this node may not be the first choice based on the geography of the user to the CDN, node or server. Accordingly, unnecessary waiting for the multimedia content item is avoided and an optimal viewing experience is maintained.

In some examples, the requested multimedia content from the second data delivery network is a lower bitrate variant of the multimedia content requested from the first data delivery network. For example, if the user content player has waited for the fetch time to exceed a threshold, then, to ensure that content is obtained quickly from the second data delivery network, the user content player can automatically select a lower bitrate variant than the previously requested content. In this way, the content can be retrieved quickly. In some examples, after a buffer of content has been obtained, the user content player can then request higher bitrate variants to replace some of the lower bitrate variants previously requested and obtained.

In some examples, if the user content player determines that it is making the appropriate requests for bitrates based on its measurements, and rebuffering is still an issue, then the client can inform a quality of service (QoS) server, and request a list of servers that can be used to stream the remaining content to be consumed.

Therefore, process 200 describes an algorithm that can be used by the user content player to determine whether the client should switch to different content providers. In some examples, the second data delivery network is a different node in the same CDN, such as a switch from server 115B to 110, as shown in FIGS. 1A and 1B, by connection 134.

In some examples, the second data delivery network is a different CDN. For example, if OTT providers host the same content, and if the user has an account with both OTT providers, such as Amazon Prime Video and Disney+, the different content provider may be switching from Amazon Prime Video to Disney+, or vice versa. In some examples, when switching from one OTT platform to another OTT platform, i.e., switching from one CDN to another CDN, a current or next segment is obtained such that the user has a smooth viewing experience. For example, the user content player may determine that a fetch time for the next segment of the film "John Wick" is greater than the expected performance threshold (e.g., an expected download time of the next segment) on the OTT platform Netflix and therefore switch to the OTT platform Amazon Prime Video to obtain the next segment.

In some examples, the second data delivery network is a different edge server within the same data center as the current media server. In this way, a hardware malfunction for a specific server has likely occurred, and therefore the increase in latency and RTT that would come with a switch to a geographically farther CDN is not necessary.

In some examples, a list is generated by a QoS server that comprises a plurality of URLs, which is based on other servers that have the content being requested by the user content player (e.g., a user device). For example, a media server generates a manifest comprising a plurality of URL sources wherein the user content player can request a current or next segment. In some examples, the media server or the user content player can prioritize the list of URLs based on various information collected from servers and other clients, as will be discussed in more detail with regard to FIGS. 4A and 4B below. In some examples, the prioritizing may be in the form of the user content player performing a traceroute test to calculate the time it takes to reach the destination—for example, the traceroute test can indicate that a certain hop or hops are also congested and therefore might make a decision on the optimal new source based on such a test.

In some examples, when the user content player selects a new source for the media content item (e.g., a current or next segment of an adaptive bitrate stream), the user content player can inform the media server or a separate QoS server of the new chosen source. The QoS server or media server will then assist the user content player in re-routing to the new source. For example, the user content player can receive an updated manifest file that is dynamically generated in response to the fetch time being above the expected download time and signaling the same to the QoS server (which may be the first data delivery network or the second data delivery network).

A nameserver is a computer where DNS (Domain Name System) records are stored in databases. Web browsers, like Google Chrome, Firefox, Safari, or Edge, can search and read the DNS records, which tell them where to find websites. Domain Name System, or DNS, converts domain names into IP addresses. Websites are identified by an IP address. For example, an IP address for Google is 172.217.14.228. When a user is trying to navigate to google.com, their web browser searches for 172.217.14.228. Accordingly, in some examples, the switching between media content sources can be achieved with DNS-based switching for seamless and transparent switching by updating the DNS registry to a different IP address.

In some examples, the media server might automatically switch streaming sessions of other content players, associated with other end users, in the same geographical area to the new source of content based on the user content player reporting metrics that exceed predefined threshold, or the like, after the switch, and based on network performance issues reported by those clients. In some examples, multiple user content players may be on the same LAN (e.g., multiple users in the same house, or on a university campus, on the same OTT platform) watching the content. As such, only one of the user content players is needed to perform any tests to determine the quality of the service from a particular server or node of a CDN, and share that reporting with a second user content player, or inform the media server (or a QoS service). In this way, a plurality of other user content players can be changed to a different CDN or node, which in turn may reduce the load on other user content players, improving the experience for all users. In some examples, the user content players can also rely on a central service on their network to perform the test, (e.g., a home gateway, a smart appliance, etc.) based on its processing capabilities.

In some examples, the user content player is on a smartphone device. The network bandwidth for mobile devices is variable, especially when the user of the smartphone device is moving geographically over large distances, such as while traveling on a train or as a passenger in a car. While travelling, the geographical location of the user will change over time, and therefore the user may join a different CDN based on geographical location, via instructions from a media server. For instance, the user may be travelling on the east coast mainline from Edinburgh to London, in the United Kingdom. While traveling, the user content player may be receiving multimedia content from a first CDN, which is performing nominally. As the user nears their destination, London, the user content player may be instructed to join a CDN more local to a current location of the user content player. The local CDN, the London CDN, may be more congested than the original CDN. However, the user content player cannot switch back without further instruction from the OTT provider, CDN or the like.

Therefore, in some examples, the methods and systems here can be used to switch a user content player from a new CDN back to a previous CDN, wherein the new, current, CDN is not performing as well as the previous CDN, because the fetch time of the second CDN is greater than the fetch time of the first CDN. Therefore, in another approach, a method for selecting a data delivery network, comprises determining a first fetch time for requested multimedia content to be delivered to a user device from a first data delivery network; determining a second fetch time from multimedia content to be delivered to the user device from a second data delivery network; comparing the first and second fetch times; and selecting the data delivery network with the shorter fetch time. In some examples, the method of this approach further comprises receiving an indication of an expected performance threshold of the multimedia content associated with the request; and wherein the selecting the data delivery network is further based on the indication of an expected performance threshold. For example, in response to the fetch time being above the expected performance threshold for one of either the first or second data delivery networks, the user content device can switch to the data delivery network wherein the fetch time is below the expected performance threshold (e.g., an expected download time). In some examples, the user content player may switch between the first and second data delivery networks for a next multimedia content item associated with the requested multimedia content. In some examples, the next multimedia content item is a segment of an adaptive bitrate stream.

Figure 3:
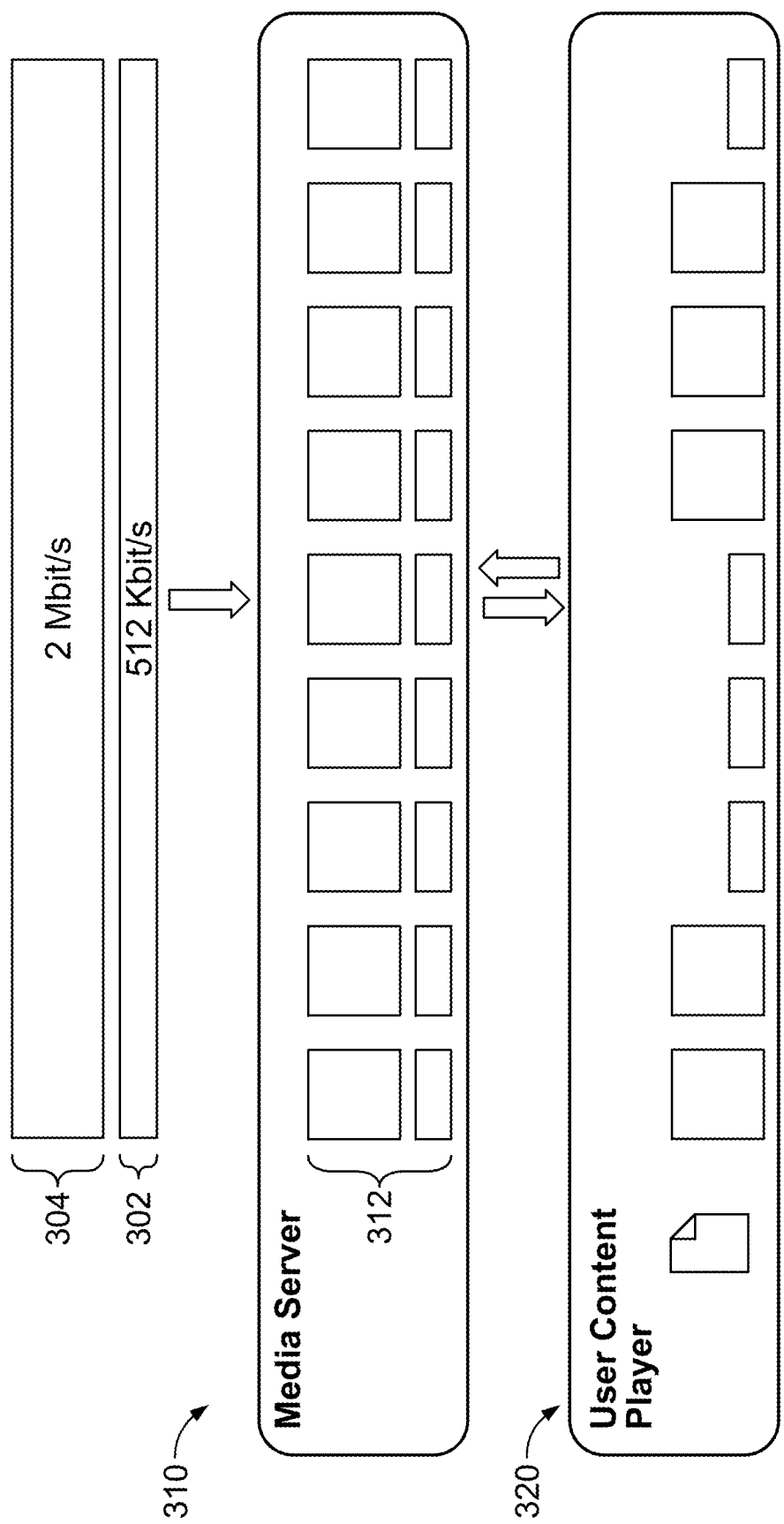
FIG. 3 is a pictorial representation of variable bitrate media content, in accordance with some embodiments of the disclosure.

FIG. 3 is a pictorial representation of variable bitrate media content, in accordance with some embodiments of the disclosure. A first bitrate variant 302 and a second bitrate variant 304 are shown as 512 Kbit/s and 2 Mbit/s, respectively. However, it should be understood that any suitable bitrates may be used and there may be more bitrate variants, with intermediate bitrate values (e.g., 1 Mbit/s or >2 Mbit/s).

In some examples, the Media Server 310 separates the first bitrate variant 302 and second bitrate variant 304 into a plurality of segments 312. Typically, the segment size is determined by seconds of content to be consumed. However, in some examples, the segment size can be determined by a number of frames, a cache size of the user content player, or an amount of data to be transmitted (i.e., a segment size limit). The plurality of segments 312 are encoded with resolutions ranging from, for example, 360p to 2160p and various quality levels using adaptive bitrate streaming compatible codecs and resolutions for adaptive video streaming formats. In some examples, the lowest bitrate variants are text, hyperlinked text, or a still image. In some examples, the highest bitrate variants are large video formats and high-quality audio. In some examples, each of the bitrate variants is separated by a minimum delta megabit per second (Mbps), for example, 1 Mbps or 2 Mbps.

In some examples, a master playlist containing URLs to each of the plurality of segments 312 is transmitted as a manifest that describes the available stream segments of an adaptive video stream and their respective bitrate variants to a user content player 320. Which bitrate variant the user content player chooses can be changed from second to second or segment to segment. For example, if a user's available bandwidth changes, the user content player 320 can select a different bitrate variant (i.e., a different video quality) to match the available bandwidth.

For example, a first user is watching a YouTube video on an iPad via a mobile network, and the video is streaming at 854×480 pixels without problems. Then, the road goes down into a valley, and the quality of the mobile network connection drops. The user content player 320 determines that the available bandwidth has decreased, and reacts to avoid buffering. The user content player 320 requests a next segment that is small enough to ensure that the video can continue to be consumed without interruption.

In some examples, the segments as described with reference to FIG. 3 are segments of a plurality of segments of an adaptive bitrate stream (e.g., MPEG-DASH, Adobe HTTP Dynamic Streaming, Apple HTTP Live Streaming, Microsoft Smooth Streaming, QuavStreams Adaptive Streaming over HTTP, upLynk, or the like).

In some examples, there are other reasons, out of the user's control or influence, that cause buffering and a poor viewing experience even with good available bandwidth. For example, a content delivery network may experience congestion, a network glitch, a hardware malfunction, or the like, which causes the next segment of the plurality of segments 312 to be delayed in being sent to the user content player 320. In this way, the user will experience buffering, a poor viewing experience (as a lower quality segment than necessary) or, in worst-case scenarios, an interruption to the content altogether. The media server 310 or user content player 320 may therefore store network performance information associated with nodes of a content delivery network or a data delivery network.

FIGS. 4A and 4B are examples of stored network performance information associated with nodes of a content delivery network, in accordance with some embodiments of the disclosure. FIG. 4A illustrates a table of network performance information. For example, for each node in a content delivery network or data delivery network, the total bandwidth, total ping, distance of a user to the node, jitter, total packet loss, fetch time (to retrieve a next segment), expected download time, a time stamp and segment reference number, may all be examples of the network performance information determined by the media server 310 or user content player 320.

In more detail, for example in row 410, a node in a content delivery network, based in London with a reference of "LDN 18" is providing data packets to a user in a content delivery network. In row 410, the total bandwidth available is determined; in this case, the total bandwidth is determined to be 7.5 Mbps (mega-bits per second). The total ping, that is, the round-trip time for messages sent from the originating host to a destination computer that are echoed back to the source, has been measure as 2 ms (milliseconds). This is a relatively short ping, from which it can be determined that the user is within 50 miles of the node, as shown by the distance column.

In some examples, the jitter is also determined. In row 410, the jitter has been recorded at 2 ms (milliseconds). Jitter is a variation in the delay of received packets. At the sending side, packets are sent in a continuous stream with the packets spaced evenly apart. Due to network congestion, improper queuing, or configuration errors, this steady stream can become irregular, or the delay between each packet can vary instead of remaining constant. In addition, the total packet loss has also been determined. Packet loss occurs when, while accessing the internet or any network, one or more of the data packets fail to reach their intended destination. For users, packet loss manifests itself in the form of network disruption, slow service, and even total loss of network connectivity. Any application can be disrupted by packet loss, but, the most likely victims are applications that rely on real-time packet processing, such as video, audio, and gaming programs. As shown in row 410, no packet loss has yet occurred between the user and node "LDN_18".

In some examples, a fetch-time is determined. In some examples, the fetch time is the time it will take for the user content player 320 to receive the next data from the media server 310 (e.g., a mode in a content delivery network). For example, after the user content player 320 has requested data, the fetch time may be based on the current performance of the download of the data from the media server 310. In row 410, the fetch time has been determined to be 2.01 seconds. In some examples, the user content player 320 can determine the fetch time based on the current performance of downloading the current data. In some examples, the data packet is the next segment of a plurality of segments 312 of an adaptive bitrate stream.

In some examples, an expected performance threshold is determined. An expected download time is an example of an expected performance threshold. In some examples, the expected download time is the time it would take for the user content player 320 to retrieve the next data from a media server 310 (e.g., a node in a content delivery network). For example, based on the bandwidth of 7.5 Mbps, the total ping, and jitter, user content player 320 has determined that the expected download time (i.e., the expected performance threshold) for the next data packet should be 2.2 seconds. In some examples, the expected download time is determined based on any one or more of the network performance metrics (e.g., networking performance information) determined and shown in FIG. 4A. In some examples, the user content player 320 determines the expected performance threshold. In some examples, the data packet is the next segment of a plurality of segments 312 of an adaptive bitrate stream, and therefore the expected download time (i.e., the expected performance threshold) may also be based on historical information of the previous segment download times.

The time stamp and segment reference are additional contextual information that may be determined by the media server 310 or the user content player 320, for reference or storage purposes. The other rows in the table shown in FIG. 4A may be other nodes on the content delivery network. In some examples, the other nodes may be in the same geographical region as one another. In some examples, the other nodes may be in a different geographical region. For example, and as shown in FIG. 4A, nodes may be in New York, "NYC 01," or San Jose, "SJ_001." The same network performance information may be determined for each of the nodes in the content delivery network.

In some examples, when the fetch time exceeds the expected download time, the user content player 320 selects an alternative source for the current or next data packet. For example, considering row 420, which shows the same connection of the user to the node "LDN_18" 3 seconds later, the total ping, jitter, and total packet loss have increased, while the available bandwidth has remained the same. Therefore, the fetch time has increased to 4.25 seconds, which is greater than the expected download time of 2.2 seconds. Accordingly, the user content player 320 is able to determine that there is likely a problem at the node of the content delivery network and can decide to select an alternative node to retrieve the current data packet or the next data packet.

In some examples, the user content player updates a table, such as the tables shown in FIGS. 4A and 4B. In some examples, the tables shown in FIGS. 4A and 4B are stored on a QoS server. In some examples, when selecting a second data or content delivery network, the user content player performs a look-up on a table to select a node.

Figure 5:
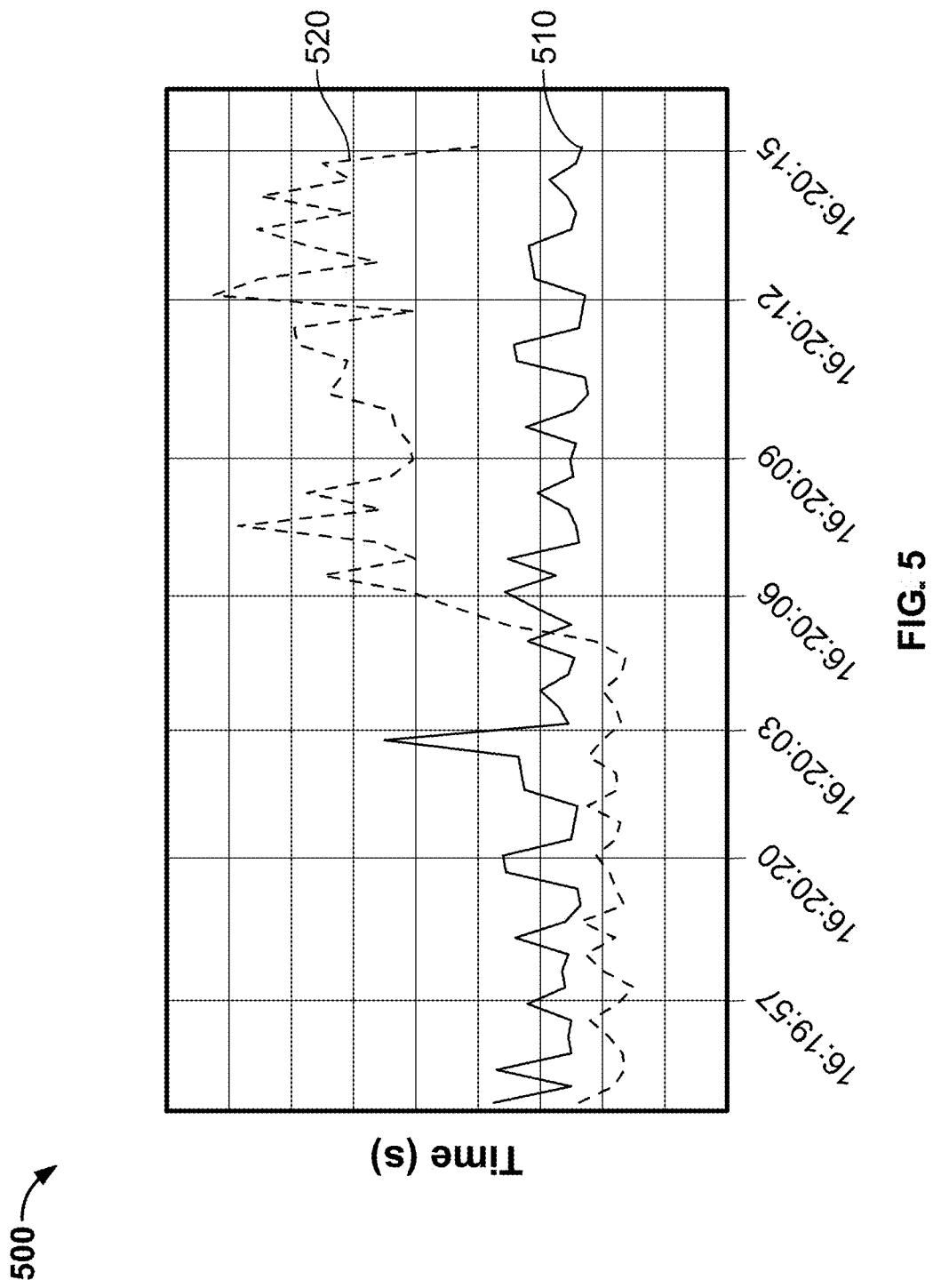
FIG. 5 illustrates the variation in fetch time and expected download time for requested content in a data delivery network over time, in accordance with some embodiments of the disclosure.

FIG. 5 illustrates the variation in fetch time and expected download time for requested content in a data delivery network over time, in accordance with some embodiments of the disclosure. Line 510 represents an expected download time of the current segment from the media server (e.g., edge server, node, or CDN) that the user content player is currently connected to. Line 520 represents a fetch time for the current segment. The y-axis shows the time in milliseconds and the x-axis shows a time stamp of the measured metrics. In some examples, FIG. 5 is displayed on a display of the user content player. For example, a warning may be shown to the user of the user content player, and the user can initiate the selection of an alternative media server or CDN.

In some examples, an expected download time 510 is received from the media server at the user content player. The variation in expected download time 510 may be based on several factors, for example, bandwidth, ping, and jitter. Fetch time 520 is determined by the user content player. The variation in fetch time 520 may be based on, for example, the bandwidth, ping, jitter, and packet loss. In accordance with some embodiments of the present disclosure, when line 520 crosses line 510, the fetch time has exceeded the expected download time (shown just before time stamp 16:20:06).

In some examples, a waiting period might be initiated when line 520 initially crosses line 510. For example, there may be a temporary and short-term glitch that causes line 520 to cross line 510, initiating a waiting period before any further action, or checking that a next time stamp still has a line 520 that has crossed 510, which prevents premature action or changing of the media server when not necessary.

In some examples, when consecutive measuring periods have a line 520 that has crossed line 510 (e.g., the fetch time has exceeded the expected performance threshold/expected download time), then any one of the processes as described here are initiated to select an alternative media server to obtain a next media content item of the requested media content.

FIG. 6 is a pictorial representation of an exemplary manifest 600, in accordance with some embodiments of the disclosure. In an exemplary manifest 600, there is provided a header 602, base URL 604, segment list 606, segment URL 608, contextual information 610, and, in some examples, an expected performance tag 612.

The manifest 600 is a container file for chunks of data that provide a user content player with the information required for the user content player to request a video or audio resource (e.g., media content or a media content item). As shown in FIG. 6, a manifest 600 starts with a header 602 and then contains a series of data blocks (604-612). In some examples, the header of the manifest identifies the format that the manifest is in (e.g., HTML, XML, or the like) and/or what adaptive bitrate technology the manifest relates to (e.g., DASH, HLS, or the like). In some examples, the header can be omitted from being present within manifest 600, because the format of the manifest 600 can be indicated by the filename extension suffix (e.g., ".xml," ".m3u8," ".txt," or the like), or a footer (not shown in FIG. 6, but included in the exemplary pseudo-code shown in FIG. 7).

In some examples, the data blocks of a manifest may comprise a block indicating a base URL 604, a segment list 606, a segment URL 608, contextual information 610, and an expected performance tag 612. Other examples of data blocks include media type, representation blocks, ID tags, file names, initialization source, subtitles, and fallback sources (e.g., failover URLs).

In some examples, a data block may be a base URL 604 for signaling the base URL that all resources to follow will be obtained from. For example, the base URL 604 is the first part of a website URL such as "http://video.platform.com/v1." It is this base URL that later-described segment URLs will be concatenated onto. Like any of the data blocks 604-612, the base URL 604 may comprise any text or character with an equivalent Unicode Code Point. In some examples, base URL 604 may be unique to the whole manifest that all subsequent URLs, such as segment URL 608 are concatenated onto.

In some examples, a data block may be a segment list 606. In some examples, segment list 606 may further comprise a segment reference, for example, a range of frames to obtain (e.g., range="0-862"), a start and end time to obtain (e.g., 1253 s to 1258 s), or a segment reference ID (e.g., "segment 12"). In some examples, the segment list 606 further comprises a bitrate variant reference ID or tag. In some examples, the segment list 606 with a range of frames to obtain is referred to as a media range. In some examples, there may be a minimum duration that the segment list 606 indicates, for example, a minimum duration of 4 seconds to obtain as a segment, although any period may be chosen as a minimum duration.

In some examples, a data block may be a segment URL 608. As mentioned briefly above, segment URL 608 is a suffix to be added to the base URL by the user content player to complete the URL to a particular segment. In other words, base URL 604 and segment URL 608 together make the complete URL to any particular media content item contained within the manifest. In some examples, the whole URL per segment or bitrate variant is displayed in the segment list 606; however, this is often unnecessary as it clogs up the manifest with a lot of repetitive data. In the concatenating examples, the overall manifest file size is kept to a minimum, reducing unnecessary overheads in the manifest file.

The manifest 600 may further comprise a data block that represents contextual information 610. In some examples, the context tag 612 is used to provide context to any one or more of the header 602, base URL 604, segment list 606, segment URL 608, or expected performance tag 612. The contextual information 610 may be a contextual tag that the logic of the user content player can interpret. The contextual information may represent language, subject matter, or segment metadata. Segment metadata includes, for example, codecs, audio tag, video tag, version numbers, encoding information, bandwidth markers, resolution or size of media content, or file names. In some examples, the context tag is configurable by the user or is configured by a user profile of the user, which can be obtained by control circuitry. For example, a user profile linked to the user content player may configure the context tag to always select the highest bitrate variant or a maximum available based on the available bandwidth. In this example, the context tag may comprise a value that the user content player can interpret and be influenced by in making the selection for CDN, node, edge server, media server, next segment, or bitrate variant if, for example, certain CDNs do not have a bitrate variant that the user prefers.

In some examples, the data blocks 604-610 as described above further comprise meta-data. In some examples, contextual information block 610 may further comprise rules on waiting periods before taking action when the fetch time is greater than the expected download time, etc. The start time, end time, and segment reference as discussed with reference to segment list 606 are considered an example of metadata of the segment list 606 data block, for example.

One example of metadata is the expected performance information. In some examples, the expected performance information is provided by an additional data block within the manifest 600, the expected performance tag 612. In some examples, the expected performance information may be embedded into any other of the header or data blocks 602-610, as will be described in more detail below with regard to FIGS. 7, 8A, and 8B.

Subtitles are also considered to be metadata of the manifest 600 subtitles are often provided in a format known as Web Video Text Tracks (WebVTT), which is a World Wide Web Consortium (W3C) standard for displaying timed text in connection with the HTML5 <track> element. Other common caption formats include XML-based Timed Text Markup Language (TTML) and the "SubRip" file format. Timed text refers to the presentation of text media in synchrony with other media, such as audio and video. Therefore, all timed text formats should be considered as falling within the scope of the methods and embodiments herein. While different timed text formats are compatible across a number of different devices and browsers due to their slight differences, all these formats contain text information to be displayed alongside a media asset such as audio, video, or a combination of both.

Any data blocks 602-612 that are not understood by legacy media asset players, due to the fact they have not been updated to read such data blocks, would be ignored. Therefore, in some examples, the manifest 600 is backward compatible with legacy user content players. Data blocks 602-612 may be separated by lines, commas, semi-colons, special characters, or any other common choices of the syntax used in computing languages such as C++, C#, Python, R, Java, JavaScript, HTML, and the like.

FIGS. 7, 8A, and 8B illustrate exemplary simplified pseudo-code for an adaptive bitrate manifest, in accordance with some embodiments of the disclosure. FIGS. 7, 8A, and 8B are considered to be exemplary implementations of manifest 600 as described previously with reference to FIG. 6.

FIG. 7 shows a manifest 700. In manifest 700 there is provided a header 702, a base URL 704, first contextual information 710, a first segment list 720, second contextual information 730, a second segment list 740, comprising first and second segment URLs 742 and 744, and a footer 750.

The manifest 700 is a container file, usually comprising lines of instructions to be carried out by a user content player. The manifest 700 may be generated by a media server, node, or CDN in response to a request to stream media content. In particular, manifest 700 starts with a header 702 comprising lines 0 and 1 of the pseudo-code. In this example, the header informs the user content player of the version and encoding formats of the manifest 700 and includes some reference sources for information. The user content player may be a web browser, media player, or application on a smartphone or other device.

The manifest 700 comprises a base URL 704 in line 2. The base URL 704 is "http://video.platform.com/v1" and is shown between two tags, indicating the base URL 704 to the user content player.

Lines 4 and 10 comprise first and second contextual information 710 and 730. The first contextual information 710, shown on line 4 of FIG. 7, comprises a contextual tag that indicates the following lines comprise information relating to English audio. The second contextual information 730, shown on line 10, comprises a contextual tag that indicates the following lines comprise information relating to the video. The user content player can therefore identify the lines following the first and second contextual information 710 and 730 as such.

Manifest 700 comprises a first segment list 720. First segment list 720 follows the first contextual information 710 on line 4, therefore the user content player will understand that the first segment list 720 is a segment list for audio, in particular, lines 5 to 9 of manifest 700 provide the information required for the user content player to obtain the audio contained within the base URL 704. In some examples, the user content player concatenates the base URL 704 with the segment URL found within the first and second segment lists 720 and 740 to obtain the full URL where the media content item can be found.

Manifest 700 comprises a second segment list 740, comprising first and second segment URLs 742 and 744. Manifest 700 comprises multiple bitrate variants for the media content item the user is requesting. In particular, a bitrate variant is contained within the first segment URL 742 requiring a bandwidth of 1 Mbit/s (megabits per second) that has a resolution of 2160×1440 pixels per square inch, as shown in FIG. 7 in the metadata of lines 11 to 14. A second bitrate variant is contained within the second segment URL 742 requiring a bandwidth minimum of 2 Mbit/s that has a resolution of 3840×2160 pixels per square inch as shown in FIG. 7 in the metadata of lines 15 to 17. The first and second segment URLs 742 and 744 point to a video titled "Joelsmixtape" encoded with advanced video coding (AVC) also referred to as H.264 or MPEG-4 Part 10, Advanced Video Coding (MPEG-4 AVC).

Manifest 700 comprises a footer 750. The footer indicates the end of the manifest 700 and often comprises contextual information such as file extension suffixes (e.g., ".xml," ".m3u8," ".txt," or the like). Further information may also be included in the manifest 700 files such as initialization sources, subtitles, and fallback sources (e.g., failover URLs).

Lines 4, 12, and 15 of manifest 700 also comprise expected performance information. The expected performance information further comprises an indication of the priority of that section of the manifest 700. In some examples, the priority or a user profile of the user configures the priority. For example, a user profile linked to the user content player may configure the context tag to always select the highest bitrate variant or a maximum resolution available based on the available bandwidth, but to always ensure audio is available (e.g., for a video podcast or music video, where the visual content is less important). Accordingly, manifest 700 shows that the expected performance information on lines 4, 12, and 15 further includes an indication of priority based on an exemplary user's preferences.

The expected performance information in manifest 700 is shown as an expected performance tag, shown as EXPTAG="X" Priori="Y", where X is a numerical value and Y is high, medium, or low. It should be understood that this example is intended to be non-limiting and numerous other examples of indicating the tag are possible. In some examples, the user content player will search through the manifest 700 to find parts of the manifest 700 of interest indicated by the presence of contextual tags, expectant performance information, expected performance tags, and/or contextual information 710.

FIGS. 8A and 8B show part of a manifest 800 comprising a first segment list 810 and a second segment list 820. The first and second segment lists 810 and 820 of manifest 800 are different examples of the first and second segment lists 720 and 740 of manifest 700, as described with reference to FIG. 7 above. In particular, FIGS. 8A and 8B illustrate different ways of implementing the expected performance information in manifest 800. For example, and as will be discussed in more detail below, each of FIGS. 8A and 8B illustrate tagging the manifest 800 with a recommended download time for each bitrate variant or a group of bitrate variants within the manifest 800.

In FIG. 8A, the expected performance information is shown as an expected download time within the header of the first and second segment lists 810 and 820. For example, EXP_DL="2" is shown on line 1 and EXP_DL="3" is shown on line 8 of manifest 800. The expected download time tags indicate that, based on a minimum bandwidth shown on lines 1 and 8, the content contained within the Segment URLs should take no longer than 2 and 3 seconds, respectively, to download. Hence a value of 2 and 3 in the tags shown on manifest 800. FIG. 8A shows the example where a group of bitrate variants, and subsequent segments, have an expected performance indicator. In this way, due to the similarity of the size of segments, resolution, codec type, and the bandwidth of the user content player during the request, it is efficient to tag all like segments with the same expected download time, for example.

In FIG. 8B, the expected performance information is shown as an expected download time for each segment within the first and second segment lists 810 and 820. For example, Exp_DL="0.5" is shown on line 3, to indicate that the segment contained within the associated segment URL has an expected download time of 0.5 seconds. Each of the segment URLs on lines 3 to 5 and 10 to 12 is shown with an expected download time ranging from 0.5 seconds to 1.2 seconds. In this way, the user content player has expected performance information for each segment of a plurality of segments and has great granularity in determining when a CDN is not performing as expected or required to maintain an optimal viewing experience.

Figure 9:
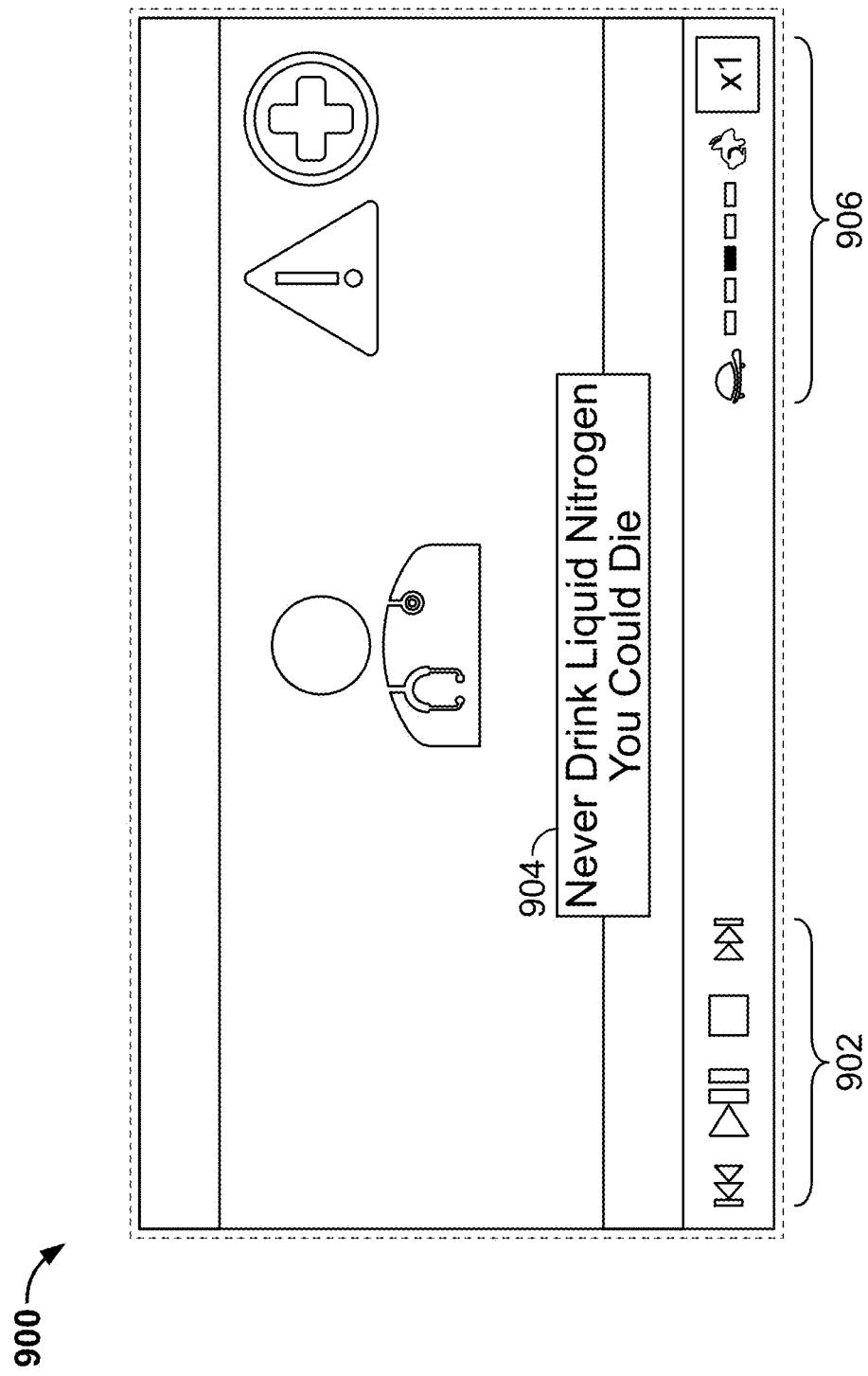
FIG. 9 illustrates an exemplary user content player, in accordance with some embodiments of the disclosure.

FIG. 9 illustrates an exemplary user content player 900. The user content player 900 is showing an informative media content item regarding the dangers of drinking liquid nitrogen, as retrieved from manifest 800. The user content player 900 also comprises content player controls 902, timed text 904, and playback rate indicator 906.

In some examples, the user content player 900, within the user's device (not shown), can calculate the time taken to fetch a group of segments or an individual segment versus what is expected, as indicated by the expected download times of FIGS. 8A and 8B. In some examples, where the end device has adequate bandwidth and the time taken to download the relevant segment/group of segments is higher than the recommended time, the user content player can switch to another source for the next segment or group of segments, even though this would not be the closest node, media server, or CDN to the user. For example, with this comparison, the user's device can switch to a stable node with some degradation in connection quality (e.g., latency or jitter) rather than endlessly trying to downland the segment from a node with congestion or some other malfunction.

The content player controls 902 comprise a play/pause button, stop button, rewind button, and fast-forward button, although these are largely for illustrative purposes and in other media asset players may be omitted in part, omitted in their entirety, shown in a different configuration, or represented by other symbols. Playback rate indicator 906 comprises a visual representation of the playback rate with a turtle and hare pictogram, largely for illustrative purposes, and in other media asset players may be omitted in part, omitted entirely, shown in a different configuration, or be represented by other symbols. The timed text 904 comprises the phrases "Never drink liquid nitrogen" and "You could die."

The user content player 900 is conventionally configured to play the media content item at "original speed" (e.g., at 1× playback speed); however, the user content player 900 may be configured to play the media asset at different speeds and any combination of trick play or variable playback rates greater than 1×.

FIG. 10 illustrates exemplary pseudo-code for an adaptive bitrate request, in accordance with some embodiments of the disclosure. In some examples, a manifest for adaptive bitrate video, such as manifests 700 or 800, is obtained by a request 1000 sent to a media server. The request 1000 may be in the form of a single request 1010 or may comprise multiple lines, requesting video, audio, and subtitles separately. The request 1000 may further comprise an indication of the user content player's bandwidth, which the media server will use to determine the expected performance information for a plurality of segments and generate a manifest, such as manifests 700 and 800.

Figure 11:
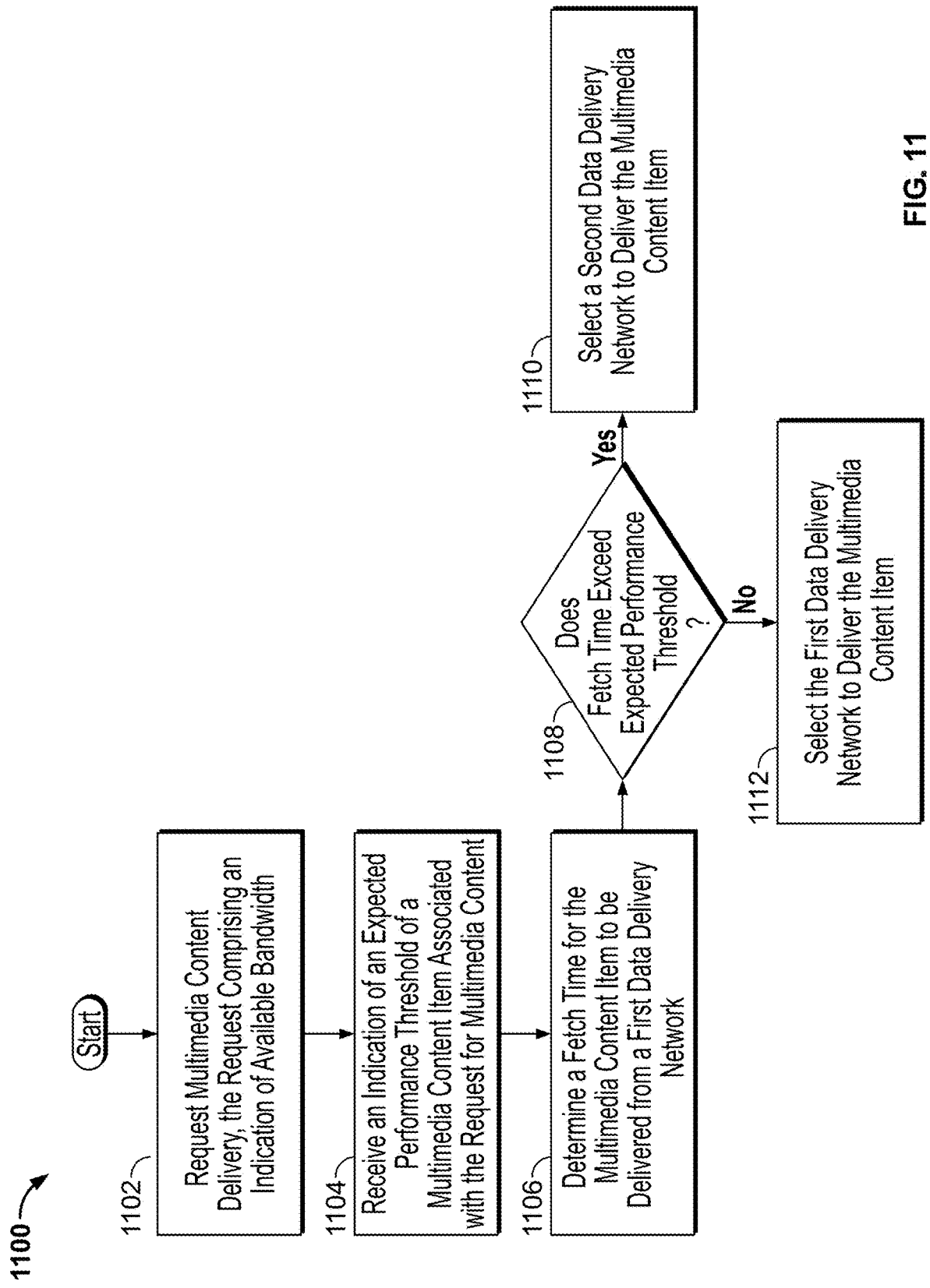
FIG. 11 illustrates an exemplary flowchart of the processing involved in selecting a data delivery network, in accordance with some embodiments of the disclosure.

FIG. 11 illustrates an exemplary flowchart of the processing involved in selecting a data delivery network, in accordance with some embodiments of the disclosure. Process 1100 begins at step 1102, wherein a multimedia content delivery is requested, the request comprising an indication of the available bandwidth.

At step 1104, process 1100 comprises an indication of an expected performance threshold of a multimedia content item associated with the request for the multimedia content. In some examples, the indication of an expected performance threshold is as shown and described with reference to FIGS. 4A, 4B, 6, 7, 8A, and 8B. For example, the expected performance threshold may be an expected download time of a segment or group of segments.

At step 1106, a fetch time for the multimedia content item to be delivered from a first data delivery network is determined. The fetch time is an indication of how long a segment is taking to download from a media server. When comparing the fetch time and expected download time for any given segment, in a nominally functioning server, node, and CDN, the fetch time is less than or equal to the expected download time. In some examples, fetch time is the time taken to download the most recent segment of a plurality of segments. In some examples, the fetch time is an average download rate, for example, 1 Mbit/s (one megabit per second). In some examples, the fetch time is the current time elapsed since beginning downloading a current segment.

At step 1108, it is determined whether or not the fetch time exceeds the expected performance threshold. If the answer to step 1108 is yes, the process 1100 continues on to step 1110. At step 1110, a second data delivery network is selected to deliver the multimedia content item. In some examples, the second data delivery network may be an edge server within the same data center, a different node within the same content delivery network, a geographically separate content delivery network, or a different OTT platform. In some examples, the choosing of a second data delivery network may be based on recent fetch time information, such as the information as shown in FIGS. 4A and 4B, as provided by the second data delivery network or another device (e.g., another device on the same LAN, another content player within the same LAN, another content player connected to the second data delivery network).

If the answer to step 1112 is no, the first data delivery network is selected to deliver the multimedia content item. In some examples, the first data delivery network may have already been providing multimedia content items before the request in step 1102. Therefore, step 1112 may simply be skipped and the process can return to step 1102.

Figure 12:
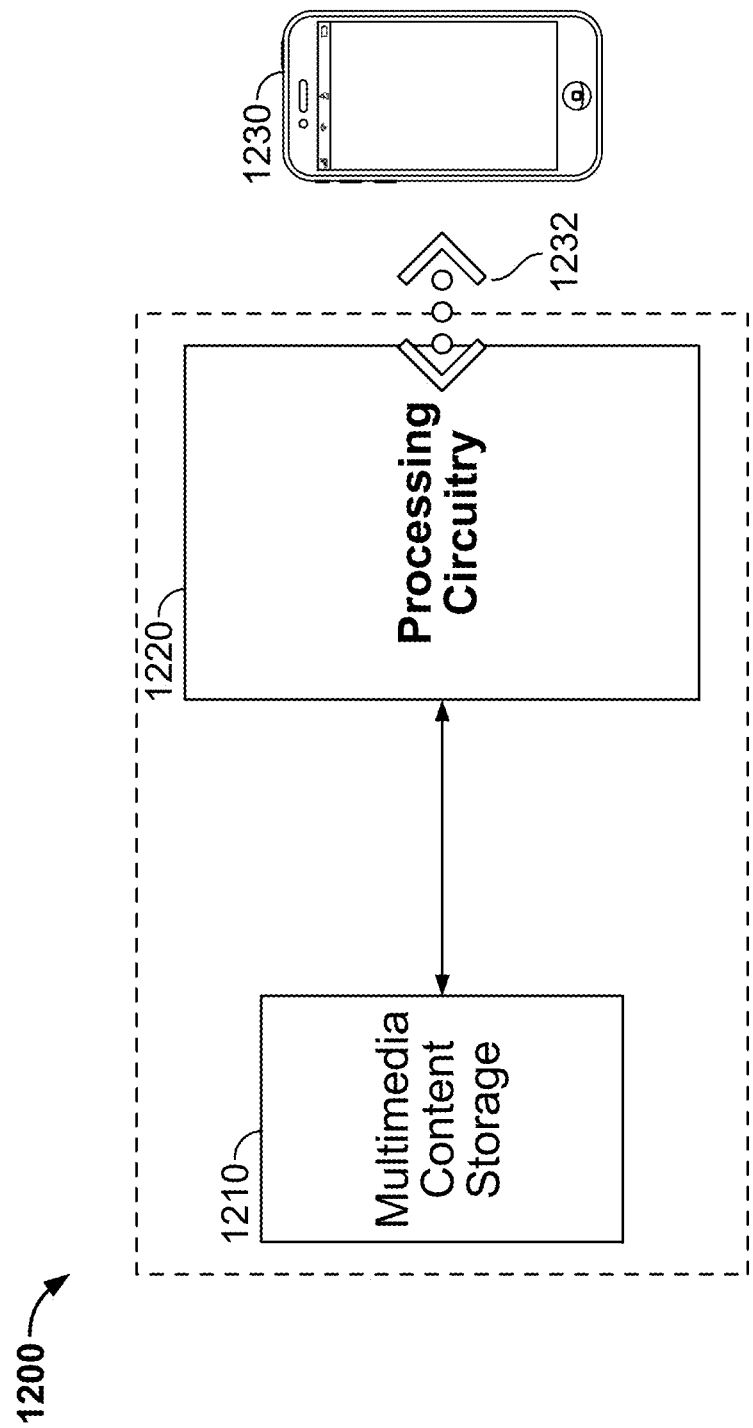
FIG. 12 illustrates an exemplary media server, in accordance with some embodiments of the disclosure.

FIG. 12 illustrates an exemplary media server, in accordance with some embodiments of the disclosure. FIG. 12 depicts an exemplary media server 1200 comprising a multimedia content storage 1210, processing circuitry 1220, which is shown to be connected to a network device 1230 via communication link 1232. In some examples and as shown in FIG. 12, the multimedia content storage 1210 is coupled to the processing circuitry 1220. The processing circuitry 1220 is configured to receive, from a network device 1230, an indication of available bandwidth at a multimedia content player; determine an expected performance threshold for the network device 1230 to download a media content item, based on the indication of available bandwidth; generate a manifest, the manifest comprising a plurality of URLs wherein each URL comprises an indication of the expected performance threshold; and transmit the manifest to the network device 1230.

The processing circuitry 1220 may comprise a plurality of processing elements, as is described in more detail with reference to FIG. 15, such as a processor or number of processors. Media server 1200 may further comprise an encoder (not shown). In some examples, the encoder is located within the processing circuitry 1220. In other examples, the encoder is located externally to the processing circuitry 1220. The processing circuitry 1220 may therefore be further configured to encode multimedia content or the multimedia content item to be transmitted to the network device 1230. The encoder may be further configured to encode the multimedia content at a plurality of bitrates, based on the available bandwidth at the network device 1230.

The media server 1200 may further comprise network circuitry (not shown). In some examples, the network circuitry is located within the processing circuitry 1220. In other examples, the network circuitry is located externally to the processing circuitry 1220. The processing circuitry 1220 may therefore be further configured to communicate with the network device 1230 via communication link 1232. The means of communication between the network device 1230 and the processing circuitry 1220 is described in more detail with reference to FIG. 15.

Figure 13:
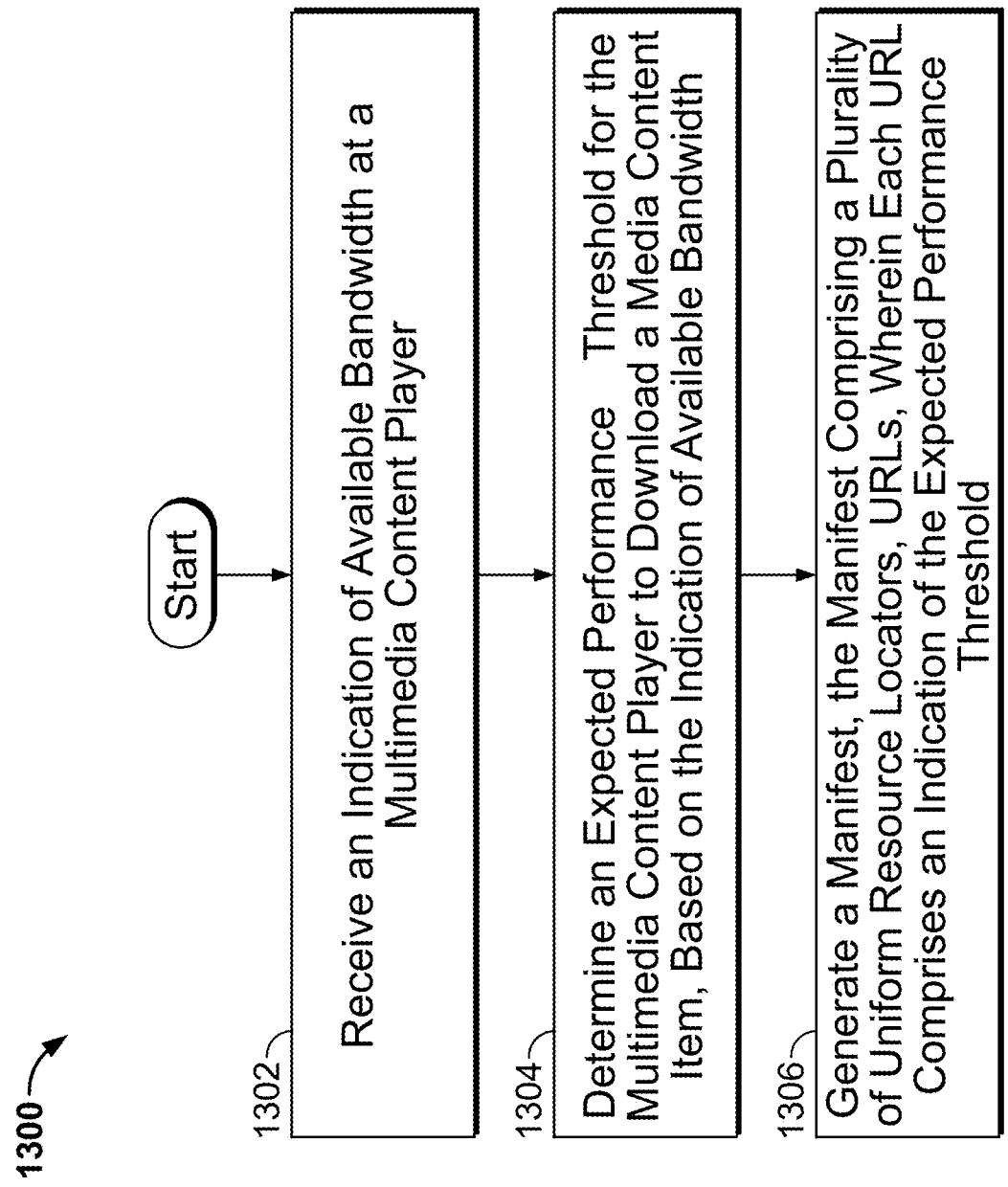
FIG. 13 illustrates an exemplary flowchart of the processing involved in generating a manifest based on the available bandwidth of a user content player, in accordance with some embodiments of the disclosure.

FIG. 13 illustrates an exemplary flowchart of the processing involved in generating a manifest for adaptive bitrate content, in accordance with some embodiments of the disclosure. In some examples, the manifest is generated by a media server, such as a node of a CDN or an edge server within the same data center as a node of a CDN. Process 1300 begins at step 1302, wherein an indication of available bandwidth at a multimedia content player is received. In some examples, the media server receives the indication of available bandwidth from a user content player. In some examples, the media server receives the indication of available bandwidth from an intermediate device, such as a home gateway or smart TV, communicatively coupled with the user content player and the media server.

At step 1304, an expected performance threshold for the multimedia content player to download a media content item, based on the indication of available bandwidth, is determined. In some examples, the expected performance threshold is an expected download time for the user content player to download the media content item based on the available bandwidth. For example, as described with regard to FIGS. 6, 7, 8A and 8B, the media server may receive an indication that the bandwidth of the user content player is 2

Mbit/s and, using this, the media server can determine how long it should take for the user content player to download the requested content.

At step 1306, a manifest is generated. The manifest comprises a plurality of URLs and an indication of the expected performance threshold. In some examples, the generated manifest may include a header, base URL, segment list, segment URL, contextual information, and an expected performance tag. In some examples, the generated manifest includes any of the features as described with regard to FIGS. 6, 7, 8A, and 8B. For example, the manifest may be generated with a tag or data block that indicates an expected download time. this tag can be interpreted by the user content player as such, and thus the user content player has the ability to assess when it needs to switch server or CDN.

Figure 14:
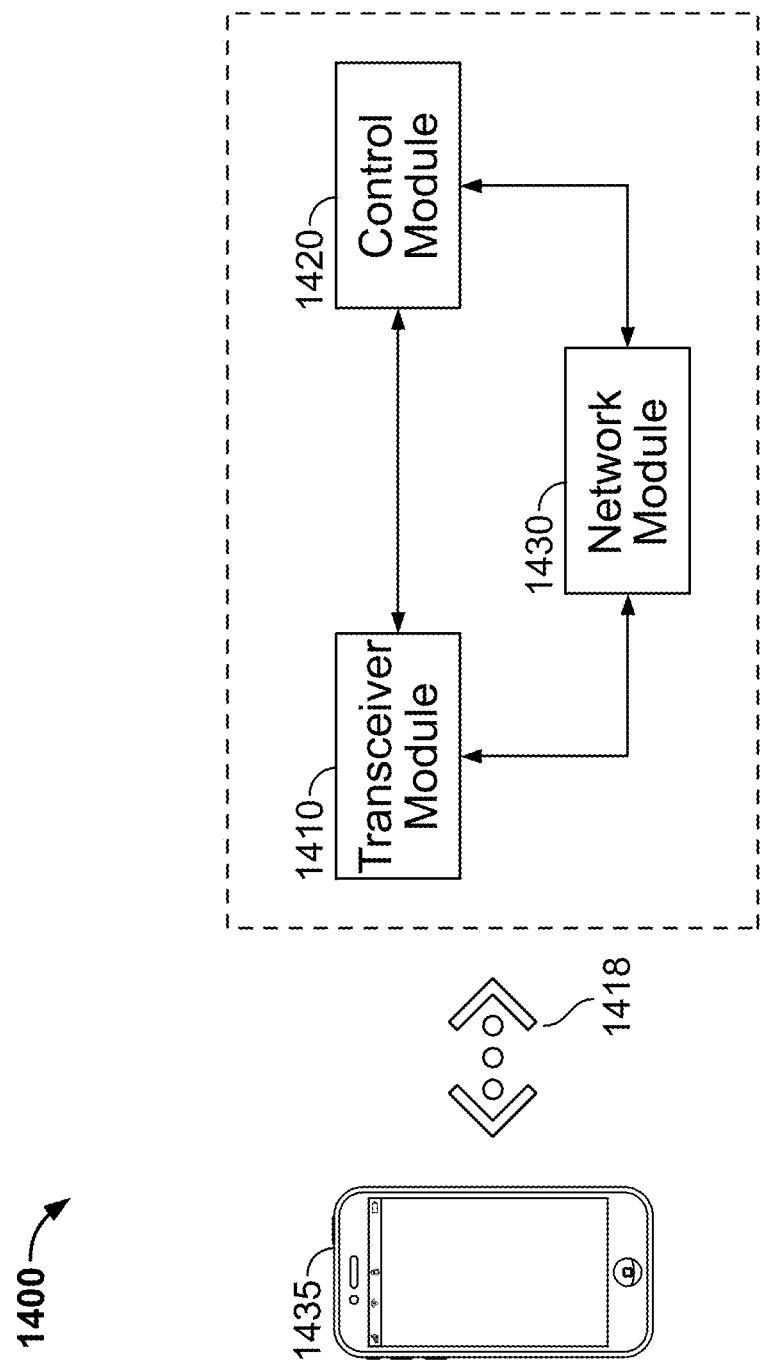
FIG. 14 illustrates an exemplary media transmission device, in accordance with some embodiments of the disclosure.

FIG. 14 illustrates an exemplary media transmission device, in accordance with some embodiments of the disclosure. The media transmission system 1400 comprises a transceiver module 1410, a control module 1420, and a network module 1430. The media transmission system may communicate with an additional user device 1435, such as a home game way, smartphone, or other smart device. The transceiver module 1410 is configured to request, to a media server, multimedia content delivery, the request comprising an indication of available bandwidth, and receive, from the media server, an indication of an expected performance threshold of a multimedia content item associated with the request for delivery of multimedia content. The multimedia content or multimedia content item may be stored on a multimedia content storage 1210, as described with reference to FIG. 12.

In some examples, the transceiver module communicates with a second user device 1435 via communication link 1418. The communication link 1418 between the transceiver module 1410 and the second user device 1435 may comprise a physical connection, facilitated by an input port such as a 3.5 mm jack, RCA jack, USB port, ethernet port, or any other suitable connection for communicating over a wired connection or may comprise a wireless connection via BLUETOOTH, Wi-Fi, WiMAX, Zigbee, GSM, UTMS, CDMA, TDMA, 3G, 4G, 4G LTE, 5G or other wireless transmissions as described by the relevant 802.11 wireless communication protocols.

In some examples, the network module 1430 is coupled with the transceiver module 1410. The network module 1430 is configured to determine an available bandwidth of the media transmission device, and determine a fetch time for the multimedia content item to be delivered, to the media transmission device, from a first data delivery network. For example, the network module may determine the available bandwidth of the media transmission device and determine the fetch time of the current multimedia content being downloaded. The network module can signal to the control module that the fetch time will exceed the expected performance threshold (e.g., an expected download time) for the current media content item.

In some examples, the control module 1420 is coupled to the transceiver module 1410 and the network module 1430. The control module 1420 is adapted to, in response to the fetch time being above the expected performance threshold, select a second data delivery network to deliver, to the media transmission device, the multimedia content item. Accordingly, the control module 1420 may select a second data delivery network to provide a better viewing experience to the end-user of the user content player.

In some examples, the communication link 1418 is between the media transmission device 1400 and a home gateway device (such as user device 121 of FIG. 1C), which is in turn in communication with the second user device 1435. In some examples, the home gateway device 121 may transmit a portion of a manifest 600 to the second user device 1435. For example, the second user device 1435 may receive just the base URL 604 and the segment URL 608 to make the GET request for the multimedia content item. In this way, it would be the home gateway device 121 that would be carrying out the selecting of a second content delivery network, node, or media server, and the second user device 1435 would be providing the bandwidth information and fetch-time information. However, these examples are considered to be non-limiting, and other combinations of the features herein being spread over two or more devices are considered within the scope of this invention. For example, each of the transceiver modules, the network module, and the control module may be separate internet of things (IoT) devices.

FIG. 15 is a block diagram representing devices, components of each device, and data flow therebetween for an adaptive video streaming system, in accordance with some embodiments of the disclosure. System 1500 is shown to include a client device 1518, a server 1502, and a communication network 1514. It is understood that while a single instance of a component may be shown and described relative to FIG. 15, additional instances of the component may be employed. For example, server 1502 may include or may be incorporated in, more than one server. Similarly, communication network 1514 may include or may be incorporated in, more than one communication network. Server 1502 is shown communicatively coupled to client device 1518 through communication network 1514. While not shown in FIG. 15, server 1502 may be directly communicatively coupled to client device 1518, for example, in a system absent or bypassing communication network 1514.

In some examples, the request to stream the multimedia content is made by a user device or a network device. For example, a user device or a network device (e.g., a laptop, PC, smartphone, smart TV, or the like) requests a media server to stream the multimedia content.

In some examples, the multimedia content is an adaptive bitrate stream compatible with the MPEG-DASH standard, or other implementations such as Apple HLS. In some embodiments, the first stream of multimedia content is encoded at a first maximum bitrate and/or the first resolution. For example, the request may be a request for the next segment of an adaptive bitrate stream, and therefore the first stream of multimedia content is at a first maximum bitrate (or resolution) based on the first network bandwidth. In some examples, the second stream of multimedia content is encoded at a second maximum bitrate and/or a second resolution. For example, the request may be a request for the second segment of an adaptive bitrate stream, and therefore the second stream of multimedia content is at a second maximum bitrate (or resolution) based on new current network bandwidth, different from the first network bandwidth. The second stream may be a higher bitrate than the first stream, or vice versa, depending on the network bandwidth at the current time of the request. Accordingly, in some embodiments, each of the alternative streams comprises a plurality of bitrate variants.

In some examples, the media content is encoded using an adaptive bitrate streaming compatible codec. There are numerous examples of video codecs that are adaptive bitrate streaming compatible (e.g., x264, OpenH264, H.264/

MPEG-4 AVC, which are all codecs compatible with the video format H.264). Moreover, there are numerous examples of video formats (e.g., H.264, H.265, VP9, AV1), each of which has numerous examples of video codecs.

Communication network 1514 may comprise one or more network systems, such as, without limitation, an internet, LAN, WIFI, or other network systems suitable for audio processing applications. In some embodiments, system 1500 excludes server 1502, and functionality that would otherwise be implemented by server 1502 is instead implemented by other components of system 1500, such as one or more components of communication network 1514. In still other embodiments, server 1502 works in conjunction with one or more components of communication network 1514 to implement certain functionality described herein in a distributed or cooperative manner. Similarly, in some embodiments, system 1500 excludes client device 1518, and functionality that would otherwise be implemented by the client device 1518 is instead implemented by other components of system 1500, such as one or more components of communication network 1514 or server 1502 or a combination. In still other embodiments, the client device 1518 works in conjunction with one or more components of communication network 1514 or server 1502 to implement certain functionality described herein in a distributed or cooperative manner.

The client device 1518 includes control circuitry 1528, display 1534, and input-output circuitry 1516. Control circuitry 1528 in turn includes transceiver circuitry 1562, storage 1538, and processing circuitry 1540. In some embodiments, client device 1518 or control circuitry 1528 may be configured as client device 1230 of FIG. 12.

Server 1502 includes control circuitry 1520 and storage 1524. Each of the storages 1524 and 1538 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each storage 1524, 1538 may be used to store various types of content, media data, and or other types of data (e.g., they can be used to store multimedia content such as audio, video, and advertisement data). The non-volatile memory may also be used (e.g., to launch a boot-up routine and other instructions). Cloud-based storage may be used to supplement storages 1524, 1538 or instead of storages 1524, 1538. In some embodiments, the pre-encoded or encoded multimedia content, in accordance with the present disclosure, may be stored on one or more of storages 1524, 1538.

In some embodiments, control circuitry 1520 and/or 1528 executes instructions for an application stored on the memory (e.g., storage 1524 and/or storage 1538). Specifically, control circuitry 1520 and/or 1528 may be instructed by the application to perform the functions discussed herein. In some implementations, any action performed by control circuitry 1520 and/or 1528 may be based on instructions received from the application. For example, the application may be implemented as software or a set of executable instructions that may be stored on storage 1524 and/or 1538 and executed by control circuitry 1520 and/or 1528. In some embodiments, the application may be a client/server application where only a client application resides on client device 1518, and a server application resides on server 1502.

The application may be implemented using any suitable architecture. For example, it may be a stand-alone application wholly implemented on client device 1518. In such an approach, instructions for the application are stored locally (e.g., in storage 1538), and data for use by the application is downloaded periodically (e.g., from an out-of-band feed, from an internet resource, or using another suitable approach). Control circuitry 1528 may retrieve instructions for the application from storage 1538 and process the instructions to perform the functionality described herein. Based on the processed instructions, control circuitry 1528 may determine a type of action to perform in response to input received from the input/output path (or input-output circuitry) 1516 or the communication network 1514. For example, in response to a network bandwidth maximum, control circuitry 1528 may perform the steps of processes relative to various embodiments discussed herein.

In client/server-based embodiments, control circuitry 1528 may include communication circuitry suitable for communicating with an application server (e.g., server 1502) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 1514). In another example of a client/server-based application, control circuitry 1528 runs a web browser that interprets web pages provided by a remote server (e.g., server 1502). For example, the remote server may store the instructions for the application in a storage device. The remote server may process the stored instructions using circuitry (e.g., control circuitry 1528) and/or generate displays. Client device 1518 may receive the displays generated by the remote server and may display the content of the displays locally via display 1534. This way, the processing of the instructions is performed remotely (e.g., by server 1502) while the resulting displays, such as the display windows described elsewhere herein, are provided locally on the client device 1518. Client device 1518 may receive inputs from the user via input circuitry 1516 and transmit those inputs to the remote server for processing and generating the corresponding displays. Alternatively, client device 1518 may receive inputs from the user via input circuitry 1516 and process and display the received inputs locally, by control circuitry 1528 and display 1534, respectively.

Server 1502 and client device 1518 may transmit and receive content and data such as media content via communication network 1514. For example, server 1502 may be a media content provider, and client device 1518 may be a smart television configured to download or stream media content, such as a YouTube video, from server 1502. Control circuitry 1520, 1528 may send and receive commands, requests, and other suitable data through communication network 1514 using transceiver circuitry 1560, 1562, respectively. Control circuitry 1520, 1528 may communicate directly with each other using transceiver circuitry 1560, 1562, respectively, avoiding communication network 1514.

It is understood that client device 1518 is not limited to the embodiments and methods shown and described herein. In non-limiting examples, the client device 1518 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, client equipment, or wireless device, and/or combination of the same capable of suitably displaying and manipulating media content.

Control circuitry 1520 and/or 1518 may be based on any suitable processing circuitry such as processing circuitry 1526 and/or 1540, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 1520 and/or control circuitry 1518 are configured to implement a media content operation system, such as systems, or parts thereof, that perform various media content manipulation processes described herein.

Client device 1518 receives a user input 1504 at input circuitry 1516. For example, client device 1518 may receive a user input like a user swipe or user touch, as previously discussed. In some embodiments, client device 1518 is a media device (or player), with the capability to access media content. It is understood that client device 1518 is not limited to the embodiments and methods shown and described herein. In non-limiting examples, the client device 1518 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 1504 may be received from a user selection-capturing interface that is separate from device 1518, such as a remote-control device, trackpad, or any other suitable user movement sensitive or capture devices, or as part of device 1518, such as a touchscreen of display 1534. Transmission of user input 1504 to client device 1518 may be accomplished using a wired connection, such as an audio cable, USB cable, ethernet cable, or the like attached to a corresponding input port at a local device, or may be accomplished using a wireless connection, such as BLUETOOTH, Wi-Fi, WiMAX, ZIGBEE, GSM, UTMS, CDMA, TDMA, 3G, 4G, 4G LTE, or any other suitable wireless transmission protocol. Input circuitry 1516 may comprise a physical input port such as a 3.5 mm audio jack, RCA audio jack, USB port, ethernet port, or any other suitable connection for receiving audio over a wired connection, or may comprise a wireless receiver configured to receive data via BLUETOOTH, Wi-Fi, WiMAX, ZIGBEE, GSM, UTMS, CDMA, TDMA, 3G, 4G, 4G LTE, or other wireless transmission protocols.

Processing circuitry 1540 may receive input 1504 from input circuit 1516. Processing circuitry 1540 may convert or translate the received user input 1504 that may be in the form of gestures or movement to digital signals. In some embodiments, input circuit 1516 performs the translation to digital signals. In some embodiments, processing circuitry 1540 (or processing circuitry 1526, as the case may be) carries out disclosed processes and methods.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods. In this specification, the following terms may be understood given the below explanations:

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method comprising:
   receiving, from a media server, a manifest comprising:
   for a first segment of a media content item:
   (a) a first URL for accessing the first segment from a first source; (b) an indication of the expected download time for the first URL; (c) a second URL for accessing the first segment from a second source; (d) an indication of the expected download time for the second URL;
   for a second segment of the media content item:
   (a) a third URL for accessing the second segment from the first source; (b) an indication of the expected download time for the third URL; (c) a fourth URL for accessing the second segment from the second source; (d) an indication of the expected download time for the fourth URL;
   accessing, the first segment of the media content item from the first source via the first URL;
   measuring, by a multimedia content player, a measured download time taken up by accessing the first segment of the media content item from the first source via the first URL; and
   in response to determining the measured download time exceeds the indication of the expected download time for the first URL provided by the manifest, accessing the second segment of the media content item from the second source via the fourth URL for accessing the second segment from the second source indicated by the manifest.

2. The method of claim 1, further comprising:
   in response to the determining the measured download time exceeds the indication of the expected download time for the first URL provided by the manifest, accessing the first segment of the media content item from the second source via the second URL for accessing the first segment from the second source indicated by the manifest.

3. The method of claim 1, further comprising:
   accessing, the second segment of the media content item from the first source via the third URL;
   measuring, by the multimedia content player, a measured download time taken up by accessing the second segment of the media content item from the first source via the third URL; and
   in response to determining the measured download time taken up by accessing the second segment exceeds the indication of the expected download time for the third URL provided by the manifest, accessing the second segment of the media content item from the second source via the fourth URL for accessing the second segment from the second source indicated by the manifest.

4. The method of claim 1, wherein the first source and the second source are associated with the same over-the-top, OTT, content platform.

5. The method of claim 1, wherein the first source and the second source are associated with two or more over-the-top, OTT, content platforms.

6. The method of claim 1, wherein the first URL and the second URL for the first segment are each associated with a bitrate variant for the media content item.

7. The method of claim 1, wherein the third URL and the fourth URL for the second segment are each associated with a bitrate variant for the media content item.

8. The method of claim 1, wherein the indication of the expected download time for each URL further comprises an indication of priority.

9. The method of claim 8, wherein the indication of priority of the expected download time for each URL is based on a user profile.

10. The method of claim 1, further comprising:
    for a third segment of the media content item: (a) a fifth URL for accessing the third segment from the first source; (b) an indication of the expected download time for the fifth URL; (c) a sixth URL for accessing the third segment from the second source; (d) an indication of the expected download time for the sixth URL;
    accessing, the third segment of the media content item from the first source via the fifth URL;
    measuring, by the multimedia content player, a measured download time taken up by accessing the third segment of the media content item from the first source via the fifth URL; and
    in response to determining the measured download time taken up by accessing the third segment exceeds the indication of the expected download time for the fifth URL provided by the manifest, accessing the third segment of the media content item from the second source via the sixth URL for accessing the third segment from the second source indicated by the manifest.

11. A system comprising:
    multimedia content storage;
    processing circuitry configured to:
    receive a manifest, from a media server, the manifest comprising:
    for a first segment of a media content item:
    (a) a first URL for accessing the first segment from a first source; (b) an indication of the expected download time for the first URL; (c) a second URL for accessing the first segment from a second source; (d) an indication of the expected download time for the second URL;
    for a second segment of the media content item:
    (a) a third URL for accessing the second segment from the first source; (b) an indication of the expected download time for the third URL; (c) a fourth URL for accessing the second segment from the second source; (d) and indication of the expected download time for the fourth URL;
    access, the first segment of the media content item from the first source via the first URL;
    measure, by a multimedia content player, a measured download time taken up by accessing the first segment of the media content item from the first source via the first URL; and in response to determining the measured download time exceeds the indication of the expected download time for the first URL provided by the manifest, access the second segment of the media content item from the second source via the fourth URL for accessing the second segment from the second source indicated by the manifest.

12. The system of claim 11, wherein the control circuitry is further configured to:
in response to the determining the measured download time exceeds the indication of the expected download time for the first URL provided by the manifest, access the first segment of the media content item from the second source via the second URL for accessing the first segment from the second source indicated by the manifest.

13. The system of claim 11, wherein the control circuitry is further configured to:
access, the second segment of the media content item from the first source via the third URL;
measure, by the multimedia content player, a measured download time taken up by accessing the second segment of the media content item from the first source via the third URL; and
in response to determining the measured download time taken up by accessing the second segment exceeds the indication of the expected download time for the third URL provided by the manifest, access the second segment of the content item from the second source via the fourth URL for accessing the second segment from the second source indicated by the manifest.

14. The system of claim 11, wherein the first source and the second source are associated with the same over-the-top, OTT, content platform.

15. The system of claim 11, wherein the first source and the second source are associated with two or more over-the-top, OTT, content platforms.

16. The system of claim 11, wherein the first URL and the second URL for the first segment are each associated with a bitrate variant for the media content item.

17. The system of claim 11, wherein the third URL and the fourth URL for the second segment are each associated with a bitrate variant for the media content item.

18. The system of claim 11, wherein the indication of the expected download time for each URL further comprises an indication of priority.

19. The system of claim 18, wherein the indication of priority of the expected download time for each URL is based on a user profile.

20. The system of claim 11, wherein the control circuitry is further configured to:
for a third segment of the media content item: (a) a fifth URL for accessing the third segment from the first source; (b) an indication of the expected download time for the fifth URL; (c) a sixth URL for accessing the third segment from the second source; (d) an indication of the expected download time for the sixth URL;
access, the third segment of the media content item from the first source via the fifth URL;
measure, by the multimedia content player, a measured download time taken up by accessing the third segment of the media content item from the first source via the fifth URL; and
in response to determining the measured download time take up by accessing the third segment exceeds the indication of the expected download time for the fifth URL provided by the manifest, access the third segment of the media content item from the second source via the sixth URL for accessing the third segment from the second source indicated by the manifest.

* * * * *